April 7, 1970  W. C. WAYNE, JR  3,505,462
ELECTRICAL ORGAN
Filed March 12, 1965  7 Sheets-Sheet 1

INVENTOR
WILLIAM C. WAYNE, JR.

BY Hurwitz & Rose
ATTORNEYS

April 7, 1970    W. C. WAYNE, JR    3,505,462
ELECTRICAL ORGAN

Filed March 12, 1965    7 Sheets-Sheet 2

INVENTOR
WILLIAM C. WAYNE, JR.

BY *Hurvitz & Rose*
ATTORNEYS

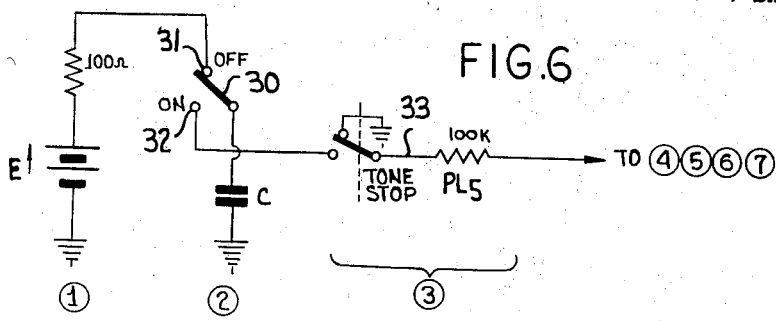
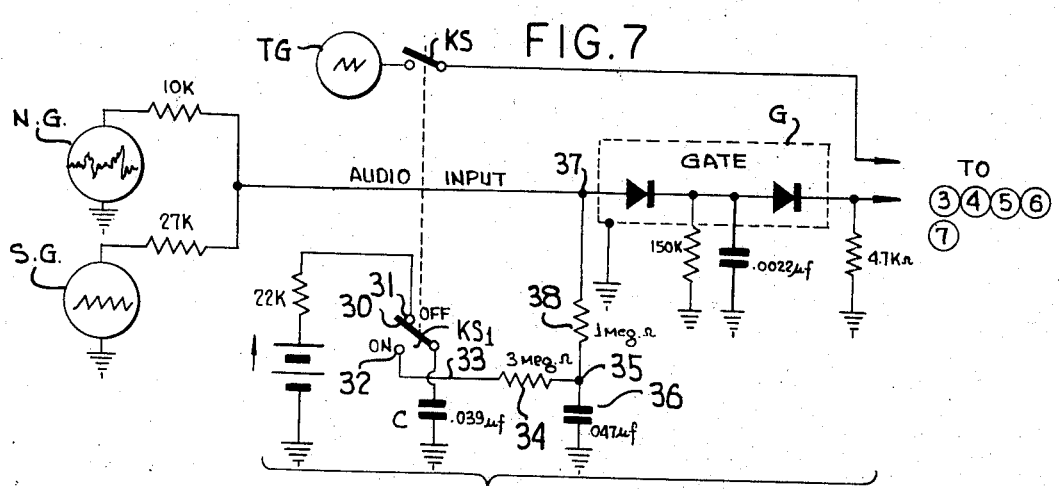
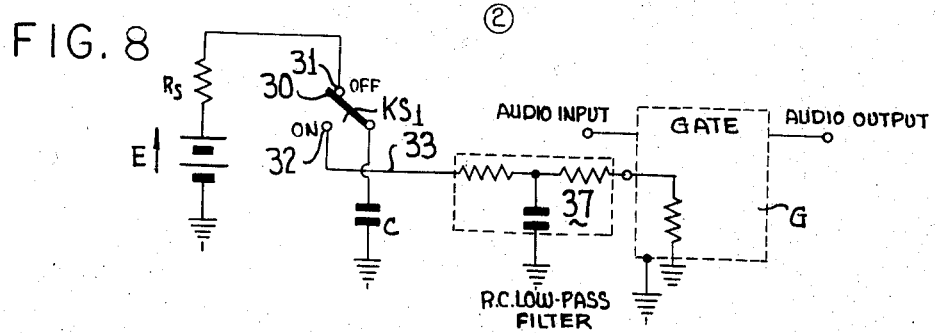
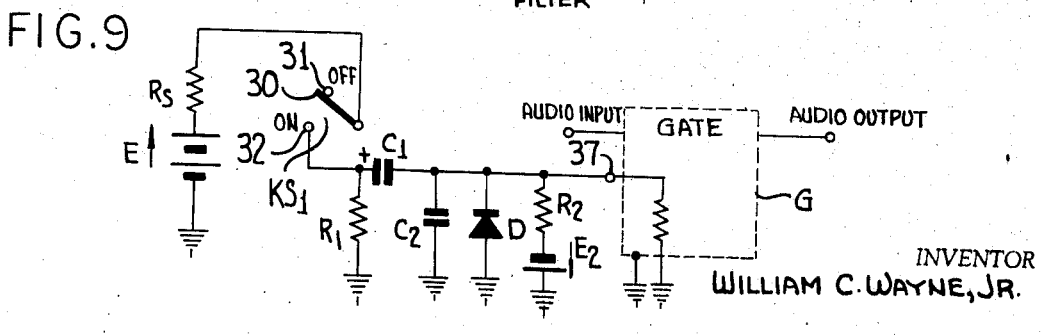

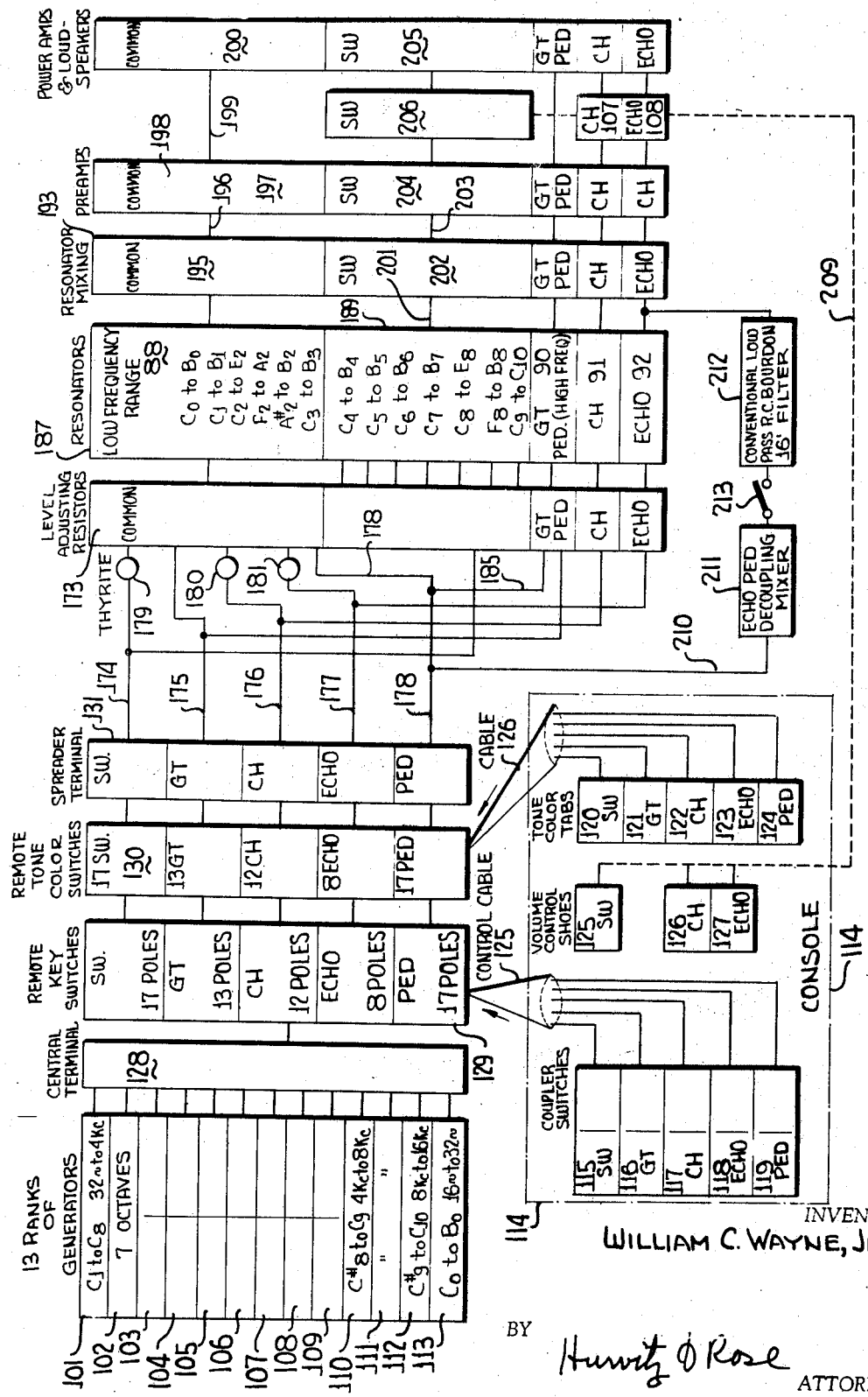

April 7, 1970  W. C. WAYNE, JR  3,505,462
ELECTRICAL ORGAN
Filed March 12, 1965  7 Sheets-Sheet 5

INVENTOR
WILLIAM C. WAYNE, JR.

BY Hurwitz & Rose
ATTORNEYS

April 7, 1970     W. C. WAYNE, JR     3,505,462
ELECTRICAL ORGAN
Filed March 12, 1965     7 Sheets-Sheet 6
FIG.12
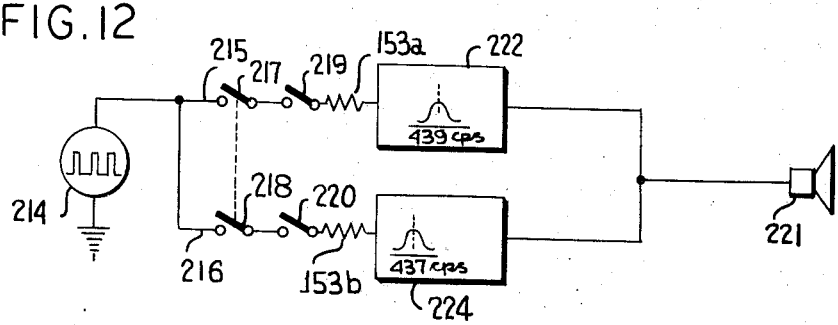
FIG.13            FIG.14
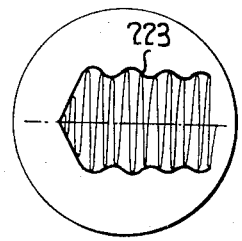 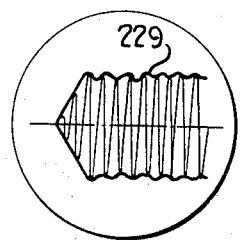
FIG.15
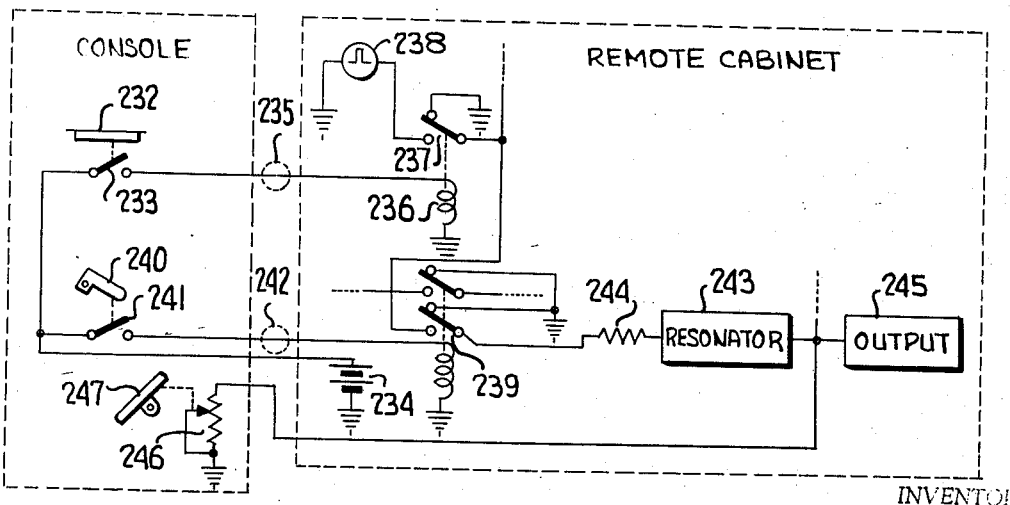
INVENTOR
WILLIAM C. WAYNE, JR.
BY Hurwitz & Rose
ATTORNEYS April 7, 1970    W. C. WAYNE, JR    3,505,462
ELECTRICAL ORGAN Filed March 12, 1965    7 Sheets-Sheet 7

INVENTOR
WILLIAM C. WAYNE, JR
BY Hurwitz & Rose
ATTORNEYS

United States Patent Office 3,505,462
Patented Apr. 7, 1970

3,505,462
ELECTRICAL ORGAN
William C. Wayne, Jr., South Fort Mitchell, Ky., assignor to D. H. Baldwin Company, Cincinnati, Ohio, a corporation of Ohio
Continuation-in-part of application Ser. No. 46,704, Aug. 1, 1960. This application Mar. 12, 1965, Ser. No. 439,140
Int. Cl. G10h 3/00
U.S. Cl. 84—1.04
55 Claims

ABSTRACT OF THE DISCLOSURE

An electronic organ in which tone signal sources drive high Q resonators, to provide various transient effects in response to key closures, and in which at least one resonator is provided for each partial of a tone, the resonators being driven through relative amplitudes of the partials. The tone signals may be supplemented with chiff and/or noise, frequency modulation of a periodic or random character, transient changes of pitch or rise and/or fall of the tone, and the like.

---

This application is a continuation-in-part of application Ser. No. 46,704, filed Aug. 1, 1960, now Patent No. 3,390,223 for Electrical Organ, in the name of William C. Wayne, Jr.

The present invention relates generally to electric organs, and more particularly to electric organs producing total characteristics imitating those produced by pipe organs.

Musical keyboard instruments of the type in which tones are generated by electrical means are variously modified as to timbre (hereinafter referred to synonymously as voice, tone color or tone quality), and are reproduced through output systems generally comprising amplifiers and loudspeakers, have come into widespread use. Means for generating tones have included electrical oscillators, reeds, magnetic tone wheels and others. In an exemplary instrument, tones of complex wave form are generated by electrical oscillators, are collected in various headers by means of switches actuated by playing keys, are modified as to harmonic content by formant-type filter circuits, and are then reproduced. United States Patent No. 2,233,948 issued Mar. 4, 1941 in the name of Kock shows an instrument of this type.

In another type of instrument, tones of simple or sinusoidal wave form are generated, usually by electromechanical means, and are mixed in such a way and in such amplitudes as to meet the requirements of particular timbres or voices, and are then reproduced.

Many such instruments are not fully adequate for ecclesiastical use in that they do not imitate perfectly the tones produced by the pipes of a pipe organ, but produce relatively simpler tones which are readily distinguishable therefrom and which, for concert and church use, are not as pleasing to the ear. For one thing, in a pipe organ, various ranks of pipes are frequently caused to speak together. Since these ranks are in practical slightly detuned from each other, "ensemble" effects result. The effects are similar to those obtained when a plurality of violins are playing the same note, as distinguished from a single violin. Also, in the pipe organ, certain ranks of pipes are deliberately detuned from other ranks by greater amounts than is utilized for ensemble effect, so that when these ranks are played together musically rich effects are obtained, generally designated by the term "celeste."

It has hitherto been suggested that the ranks of generators in electrical musical instruments be multiplied, with greater or lesser amounts of detuning as between the ranks, so that ensemble and celeste effects can be obtained. This is effective for the specific purpose; but it is expensive, and inasmuch as it does not solve the entire problem of simulating a pipe organ, there are instances in which it may be questionable whether the additional expense is justified for the result gained.

Organ pipes have specific tone characteristics which have not hitherto been imitated by electrical means. The tone envelope characteristics of the sounds produced by organ pipes are distinctive. Not only is the onset of the tones gradual; but the tones do not cease abruptly, and die away in accordance with an exponential curve. It has not been found entirely satisfactory to duplicate these characteristics by the use of gradually acting or resistive key switches. Moreover, when some organ pipes are actuated, the first sound heard is the second harmonic or some other harmonic or subharmonic of the fundamental tone, after which the fundamental and other partials are added to the tone. The onset and decay rates of reed tones are much more rapid than those of diapason and flute tones. Yet, again, when air is cut off from an organ pipe, and during the exponential decay of the tone (which results from the pipe's resonator remaining in active condition for a brief interval), there is a change in the timbre or the frequency, or both, from that existing in the steady state. Thus many organ pipes go slightly flat when they are deactivated and before the sound ceases to be audible. There are types of pipes, designated Harmonic Flute or Harmonic Trumpet for example, which are so constructed that when they are actuated by a blast of air, there will be an audible effect of a frequency which is half of the fundamental frequency of the pipe, and which will be somewhat audible throughout the operation of the pipe, but more so at the start of its operation.

The last mentioned effect is called "chiff," as is the analogous effect which exists in certain other types of pipes, wherein a harmonic or nearly harmonic frequency is transiently heard on initiation of a tone, a common harmonic being the fifth. The chiff effect can be defined as including or excluding a transient wind noise, accompanying a subharmonic, harmonic, or inharmonic initial transient, and the wind noise need not necessarily be precisely synchronous with the transient tone nor of corresponding evelope shape, nor include overlapping frequencies. Organ pipes may also produce wind noise, either throughout a tone; or, only at its initiation or initial portion, but without an accompanying transient frequency.

It is one function of the present invention to provide, in an electronic organ, the various transient effects which are important to identification of pipe tones.

In its essence, the system of the invention involves, for a single rank of complex tone generators, a plurality of resonators or filters, which may be capable of selecting single partials from complex tones. Associated with the resonators are partial-level circuits. These each apply to entire tones, but have the function of setting the amplitudes of selected partials which are to form a tone, prior to application of the entire tones to the resonators. Thereby, the formation of tone color may be accomplished by a set of resonators, driven from the tone generators, but with the interposition between each tone generator and each of the resonators which it will drive, of a partial-level control device, usually but not necessarily a resistance. The resonators may be high Q, providing gradual rise and decay of tones without requiring gradual gating circuits or variable resistance switches. The resonators may be detuned with respect to the partial frequencies to provide variable frequency transisents, or more than one resonator, relatively detuned, may be provided per partial, to provide complex tone patterns. For example, a given partial may excite a resonator to which it is precisely resonant and another to which it is nearly resonant. Still further, plural detuned ranks of generators may be employed, from various ones of which partials of a tone can be selected, which can provide celeste and/or chorus effect, and can phase-unlock the components of a single tone spectrum as provided by a single organ division.

An important feature of the basic system is that a single tone generator, which provides a complex wave form and therefore many partials, can drive a different resonator for each of the partials, or can drive a different pair (or triplet) of resonators for each partial. If plural ranks of generators are employed, a single resonator can be driven simultaneously from all the ranks, or from only some of these if there are more than two. Or, for a tone of given nomenclature, involving plural partials, some partials may be derived from one rank and some from another.

It follows, that by proper selection of generators, partial-level circuits and resonators, in forming any one tone, a very wide selection of tone colors and initial and final transient makeup, and envelope shapes can be achieved.

For many purposes the resonators should be high Q resonators, perhaps with Q of 50 or 100. For other purposes, however, relatively broad band filters may be substituted. The latter may, for example, be high pass and encompass frequencies greater than say, 5000 c.p.s. Such substitution is envisaged essentially for purpose of economy, in the frequency ranges where the transient responses of high Q resonators are musically unnecessary or even deleterious.

The system, as briefly described hereinabove, provides that a number of tone generators can be employed as a reservoir of partials, and that these partials can be simultaneously used in one division of an organ, but also are available for other divisions of the organ. There is also a reservoir of resonators (about 154 are used per division) which can be employed to control many thousands of partials which can be called forth by an organist on pulling out stops, the same bank of resonators being employable for all colors of one division. These resonators can provide not only partial selection, but also partial interaction and transient responses in both frequency and amplitude, so that the resonators modulate the partial outputs of the generators in both the frequency and time domains.

Generators are shared among several organ divisions, such as Swell, Great, Choir, and Pedal. A given resonator bank is shared by many partials of one division having separate expression. A division, having a bank of resonators limited in number, can derive all its tone colors from these. It can also derive all its partials from a limited number of complex tone generators, which are themselves being used to supply other divisions of the organ. Tone colors and transients are provided, in most cases, on a partial by partial basis, by partial-level circuitry, usually resistance matrices, which precede the resonators on the basis of one partial-level circuit per partial having separate expression. Each stop tab thus involves selection of a matrix for all resonators involved in a division.

It is further the case that a given partial of a note of given nomenclature, say the fundamental frequency of middle C, can be derived from plural generators of one division, as different order harmonics of these, and/or from any of the available ranks of generators on a like basis.

It is, accordingly, an object of the invention to provide a system in which simple make-and-break switches may be used for both the keying of audio frequency voltages of complex wave form and for the selection of tone colors, without generating key clicks, by employing high Q resonators to select tone partials.

It is another object of the invention to provide a system in which harmonics or partials of a tone are individually selectable and adjustable by the organ voicer as to amplitude and, if desired, as to sonance, i.e. waveform change with time.

It is a further object of the invention to provide an organ system using resonators for selecting partial with which to synthesize tones, wherein the resonators may have exact harmonic or stretched harmonic relationship to the fundamental frequencies, the latter condition simulating actual acoustically loaded pipes whose effective length changes because pipe end-correction is a function of frequency.

It is another object of the invention to provide a system in which ensemble and celeste effects may be obtained with minimum complication and cost in a concert organ.

It is an object of the invention to provide a tone production system in which initial transient amplitude and initial frequency modulation may be automatically obtained and in which final transients, similar to those which occur because of the decrease in air pressure in an organ pipe when the valve is closed, are also obtainable.

It is an object of the invention to provide means whereby the pulse-like oscillations from a tone source may be randomly frequency-modulated by a "noise" frequency, or periodically modulated by a sub-audio frequency, as in vibrato, or both. Yet again, it is an object of the invention to provide for the linear addition of noise frequencies to the pulse voltage to produce random amplitude fluctuations similar in effect to the "windiness" in organ pipes.

Further features of the invention are to provide:

(1) Ensemble and celeste effects by purposeful detuning of a number of continuously oscillating sources, but not requiring as many sources as in a pipe organ.

(2) Initial and final transient effects so designed as to produce realistic temporal changes of amplitude, frequency, and tone quality.

(3) Random changes of the so-called steady state amplitude, frequency, and tone quality for simulation of wind noise.

(4) Improved means for control of the partial tone content of each note of each stop, but not requiring as many components as are found in a pipe organ.

(5) Conventional low-power, make-break switching so that traditional console features of light key-touch, full complement of couplers, and a fast capture combination action are possible.

It is another object of the invention to provide an organ system having plural generator ranks, and plural banks of high Q resonators per organ division, wherein each resonator of a division may be operatively associated with signals to which it is responsive, drawn from any available one or ones of the generators, in any desired amplitude for each of the signals.

A still further object of the invention resides in the provision of chiff effects of various types, by various instrumentalities.

A further object of the invention is to provide controllable chiff effects occurring only at the commencement of a tone and not at its termination.

Still another object of the invention is to provide circuitry for deriving response from plural resonators connected in parallel at their outputs, with minimum cross coupling, maximum signal-to-noise ratio, maximum efficiency and minimum detuning of one by another.

Still further objects of the invention are to add noise Doppler components to the partials of a tone, which are inaudible in absence of the tone, and, to provide economically for the relative delay of selected partials with respect to the remainder of a note, as by means of thermistors, and the production of initial transients by means of thermistors.

The above and still further objects, features and advantages of the present invention will become apparent upon consideration of the following detailed description of one specific embodiment thereof, especially when taken in conjunction with the accompanying drawings, wherein:

FIGURE 6 is a circuit diagram of a system for producing a transient keying pulse in response to actuation of a switch, useful in the production of chiff;

FIGURE 7 is a schematic circuit diagram of a chiff generating circuit, according to the invention;

FIGURES 8 and 9 are schematic circuit diagrams of modifications of the system of FIGURE 7;

FIGURE 10 is a block diagram of an organ system, according to the invention, to which may be added at will certain devices separately illustrated;

FIGURE 12 is a partial circuit diagram showing the relationship of a generator and a series of resonators;

FIGURES 13 and 14 are oscillograph representations of the transients obtained in FIGURE 12;

FIGURE 15 is a partial circuit diagram illustrating connections between the console and the remote cabinet;

Figure 1:
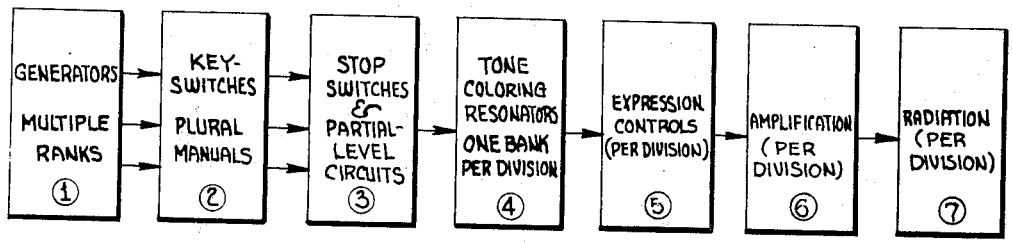
FIGURE 1 is a block diagram of an organ system, containing the basic features of the present invention in simplified form.

The system of the invention is, in its elementary essence, and apart from details, exemplified in FIGURE 1. That figure shows an array of organ elements, 1–7, in cascade, in the order (1) Generators
(2) Key switches
(3) Stop switches and partial level circuits
(4) Tone coloring resonators
(5) Expression control
(6) Amplification
(7) Radiation The organ element 1 constitutes tone sources or generators, preferably sawtooth wave or triangular wave, so that each source or generator provides a partial-rich waveform. As many ranks of sources may be included as may be desired for a given application. The key switches 2 select generator outputs from among the ranks available, which have fundamentals an other partials which will be needed in synthesizing a desired tone color. The stop switches and partial-level circuits then modify the amplitudes of the keyed generator outputs to desired relative levels and pass these to selected tone coloring resonators, selection being effected on the basis that all partials passed by the resonators at the levels set by the partial-level circuits will be added together to form a tone of a given timbre. The term timbre is here used to include not only frequency content, but also phase content, transient content in the time and frequency domain, chiff or noise content, and wave envelope shape. Expression control 5, amplification 6 and radiation 7 are conventional but may consist of plural organ divisions, in which case each division may employ its own set of resonators and partial level circuitry, but may derive signal from any or all generator ranks.

The system of FIGURE 1 provides that a number of continuously oscillating generators can be all simultaneously utilized within one division, but also for more than one division in an organ, by switching or channeling partials via elements 2–7, inclusive, assigned to each given division. More specifically, for a multi-division organ, there would be several manuals. Likewise, there would be provided a separate stop-switch and partial level circuit assembly for each division. Tone color resonators may pertain in separate banks to separate divisions, but also at least some of the same resonators may pertain to different divisions, if desired. Secondly, a given bank of resonators, involving about 154 per division in the present system, can be simultaneously utilized to control, in the time and requency domains, several thousand partials. These may all be called forth together by an organist when he pulls every stop in a given division.

Many organs, both pipe and electronic, employ separate generators and associated tone coloring means for each stop. The present invention permits or enables common utilization of generators and resonators, for forming tones of given color, considered in both the time and frequency domain, i.e. in terms of both transient and steady state in both amplitude and pitch.

The burden of the discussion is, that generators and generator ranks are shared among several organ divisions, as swell, great, choir, pedal and also that any one resonator bank is shared by many, many partials of one division having separate expression. In a sense, tone colors are synthesized at will, according to the present invention, by selection of partials by means of the bandpass action of individual high Q filters and partial-level selection circuits, i.e., an amplitude adjuster for each partial at each resonator, may be used. The amplitude adjuster operates prior to the resonator, and hence adjusts the levels of an entire complex tone, and the resonator then selects the desired partial. It is, of course, theoretically feasible to adjust amplitude following partial selection, instead of preceding partial selection, but this procedure involves problems of eliminating crosstalk, which do not appear in the arrangement of FIGURE 1. Therefore, the order of the operations of FIGURE 1 becomes important. Still further, the selection of partials by high Q resonators provides certain steady state responses, which are of great value in the organ art. Yet, if partial selection were accomplished by relatively broad band filters, some of the valuable achievements of the present system would remain, i.e. the possibilty of generator rank sharing, and the mode of selecting tone color by amplitude leveling, but with a consequent decrease in cost in that far fewer filters, and of a less expensive type, could be employed. Such filters must, however, be capable of separating out individual partials from the output of a complex wave generator.

Figure 2:
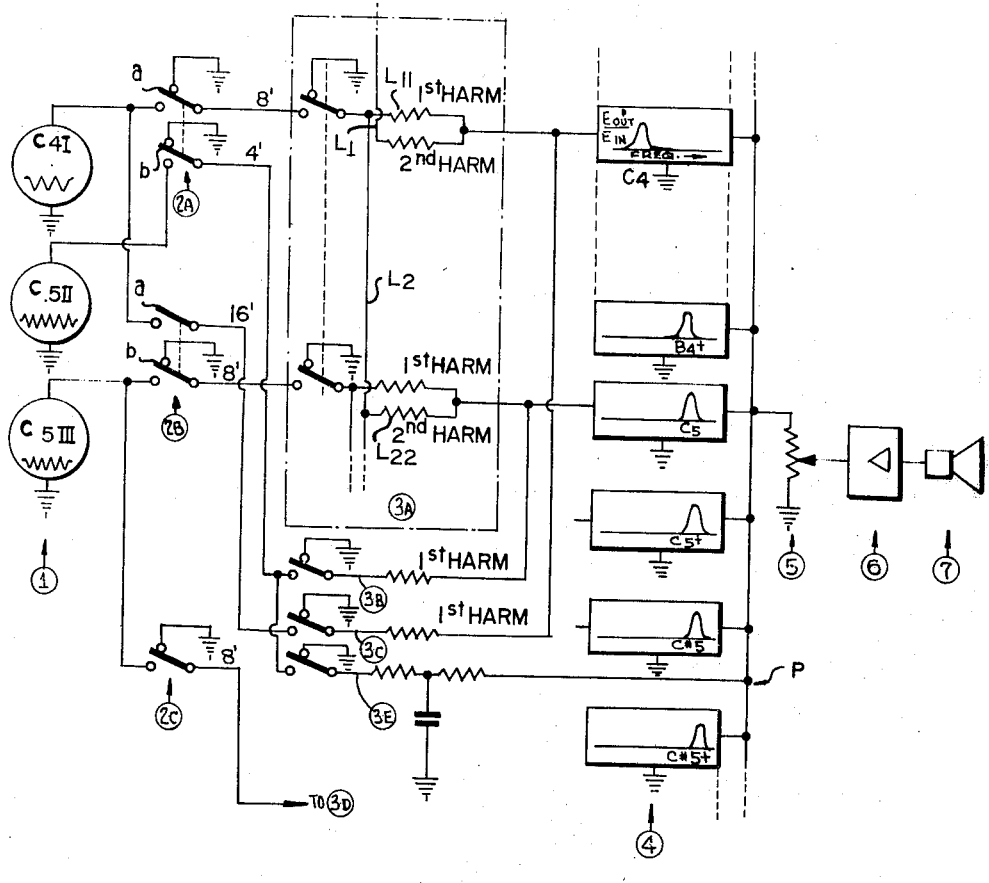
FIGURE 2 is a diagram, partly schematic and partly in block form, of a detail of a portion of the system of FIGURE 1.

In order to explain, in detail, the application of the general principles enunciated in respect to FIGURE 1, resort may be had to FIGURE 2.

At position 1 (FIGURE 2) are illustrated three generators, $C_{4I}$, $C_{5II}$ and $C_{5III}$. The designations I, II, III denote ranks of generators, and the subscript designations 1, 2, 3, 4, etc. octave number. So $C_4$ denotes C in octave 4 and $C_5$, note C in octave 5, i.e. one octave above 4. $C_I$ denotes a C generator in rank I, and $C_{4I}$ denotes a C of the fourth octave derived from rank I. The signals provided by the generators may be switched through remote electromagnetically operated key relays, for which intake-break contacts are illustrated at 2A, 2B, 2C, which in turn are connected via a cable to conventional console playing key-actuated, rocker-bar, coupler switches. The output poles of the relay contacts are normally grounded to prevent feed-through via stray capacity bridging.

Contacts 2C are, in the fragmentary example given, associated with the 37th great division manual key and contacts 2A and 2B with the 25th and 37th swell division keys, where the lowest manual key is numbered 1. Note, then, that individual generator ranks do not pertain to individual manuals, but that sharing of ranks among manuals is extensively employed.

Switches $2A_a$ and $2A_b$ derive tone, respectively, from generators $C_{4I}$ and $C_{5II}$, while switches $2B_a$ and $2B_b$ derive tone signals, respectively from generators $C_{4I}$ and $C_{5III}$, for the swell division. At the same time switch 2C provides tone signals from generator $C_{5III}$ to 3D, a partial-level circuit in the great division, a fact which is noted as exemplifying and advantage of the invention, i.e. tone-signal sharing among divisions of tone signals derived from any rank or ranks, but which is not further involved in the immediate discussion.

3A, 3B, 3C, 3E represent different partial-level circuits pertaining to the swell division, and include swell division stop switches and amplitude leveling resistances, which serve to establish the amplitudes of signals applied to swell division tone coloring resonators (4). The responses of the latter are collected and applied to swell division expression control (5), swell division amplifier systems (6), and swell division sound radiators or electro-acoustic transducers (7).

Generator $C_{4I}$ is connected via switch $2A_a$ to an 8' bus, to feed stop switch assembly 3A, which represents a specific stop or tone, say Swell Phonon Diapason 8'. Only two of the required 61-pole, double-throw ganged switches are shown as included in 3A, and only one pole is shown for stops 3B–3E, but it is to be understood that, for a 61-note manual, 61-pole stop switches are required. For a 32-note pedal, only 32-pole stop switches are required to transfer the required number of signals to a selected set of leveling resistances or impedances. Generator $C_{4I}$ is also programmed for use in a 16' line via $2B_a$, and on to 3C, which might be, for example, a Swell Flute 16'. For each generator rank a pole may be required in each key switch, and a 61-pole stop switch may be required for each stop switch.

Generator $C_{5II}$ is connected via switch $2A_b$ in a 4' bus and on to 3B, say Swell Flute 4'. This procedure is intended to make clear that the 8' and 4' stops elicited by playing swell key No. 25 need not be derived from locked-frequency generators, but can be derived from distinct ranks of generators.

The $C_{5III}$ generator is connected via switch $2B_b$ in an 8' line and on to 3A. This procedure is intended to make clear that tone signals an octave apart on one 8' stop elicited by playing swell keys No. 25 and No. 37 need not be derived from distinct ranks of generators.

Directing attention more particularly to the 3A stop switch and partial-level assembly, the 8' line from $C_{4I}$ proceeds via a first harmonic partial level line $L_I$ to leveler $L_{11}$, to resonator $C_4$; and via a line $L_2$ and a second harmonic leveler $L_{22}$ to resonator $C_5$, and it would normally proceed to as many resonators via as many level setting resistances or impedances as were needed to synthesize a desired tone quality, including desired temporal features, provided by the selected resonators. So, note that $C_5$ and $C_{5+}$ (the subscript + means 50 ¢ above $C_5$) resonators are provided, which are relatively slightly detuned ($C_{5+}$ sharp to $C_5$) as indicated by +. As hereinabove described, the transient character of the generated tone and its character during steady state, depend on which resonator or resonators are employed (see FIGURES 13 and 14), and are not derived from use of special gating circuits. For very high frequency notes, resonators are not needed, since abrupt attack and release are pleasing for such notes. In such case low pass RC filters are employed, as at 3E in FIGURE 2.

The system of FIGURE 2 shows, then, the utilization of three distinct ranks of generators, to provide signal for one division of the organ. It indicates that generator outputs, themselves complex, are selected by keys, one key operating plural switches, and the plural switches selecting generators which may be octavely related, or not, i.e. be of the same or a different octave. For example, key 2A actuates switches $2A_a$ and $2A_b$, which provide tone from generators $C_{4I}$ and $C_{5II}$, while key 2B selects tone from generators $C_{4I}$ and $C_{5III}$. The same oscillator thus responds to plural keys, and the same key calls forth tone signals from diverse oscillators, both in respect to rank and octave.

Each generator output, as called forth, can proceed to one or more amplitude level circuits, which provide examples of the complete outputs of the generators, at distinct or selected levels for each partial. These examples are then sampled by resonators, which select partials from which a desired tone color will be synthesized. The partials are thus automatically set by the selected levels, the latter levels having been deliberately chosen to make available desired partials at desired partial levels.

In the system of the invention a large number of resonators (154) pertaining to a division are always connected to a common load, thus supplying signal in parallel to one output, the number of signals varying between zero at minimum and 154 at maximum, at any one time. It is required to combine the resonator outputs without severe loss of signal and degradation in available signal-to-thermal noise ratio. Impedance looking into the load must be very low (about 1 ohm), so as not to reduce the Q's of the resonators, nor permit mutual interaction between them, and thus render ineffective the pre-tuning of the resonators. FIGURE 2 does not indicate how the problems recited in this paragraph are solved.

Figure 4:
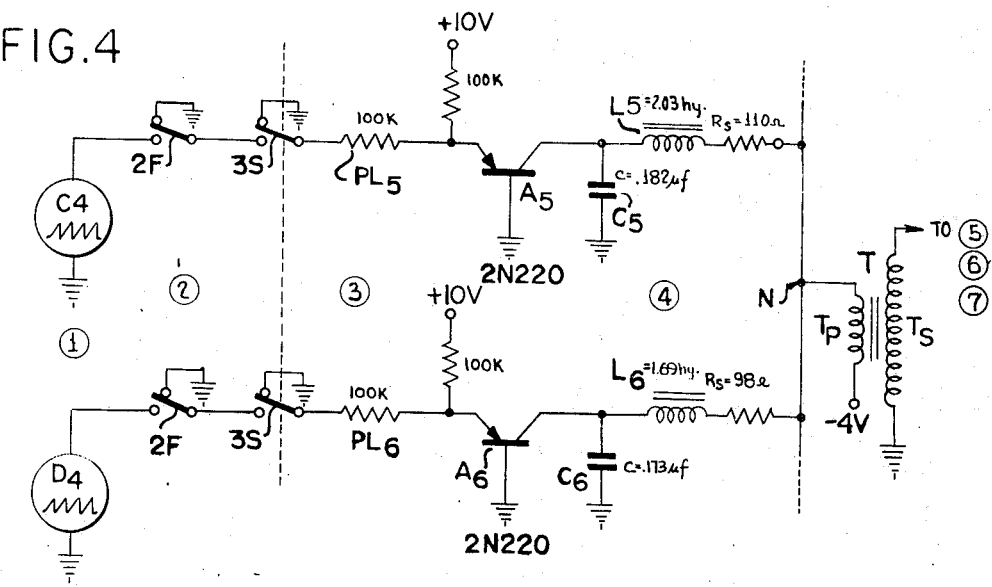
FIGURE 4 is a schematic circuit diagram of a system for combining partials, in the system of FIGURES 1 and 2.

Referring now to FIGURE 4, two exemplary tone generators are shown, identified as $C_4$ and $D_4$. $C_4$ is connected via a key switch 2F to a stop switch 3S, as in FIGURE 2, and via a leveling resistance $PL_5$ to a pnp transistor amplifier $A_5$ operating in the common base configuration.

The amplifier $A_5$ drives a tank circuit having in parallel a capacitor $C_5$ and an inductance $L_5$, the latter proceeding to a nodal point N, which is connected to a —4 volt supply terminal via a transformer primary winding $T_p$ of the transformer T, the secondary winding $T_s$ of which proceeds to elements (5), (6), (7) of FIGURE 1. The winding $T_p$ may reflect an impedance of 1 ohm, for example, and the tank circuit a resonant Q of 30, $L_5$ having a series resistance of 110 ohms at the resonance frequency.

The amplifier $A_5$ has (A) unity current gain and (B) low input impedance. Point (A) implies that the signal voltage across the tank circuit at the resonance frequency is high and equal to the generator input signal voltage component of corresponding frequency when the tank circuit is designed to have an impedance of about 100 KΩ, and a typical level setting resistance, as $PL_5$, is also 100 KΩ. Generator loading is thereby minimized, which is vital since one generator may supply many output loads. Further, because of point (B), as different leveling impedances are substituted to provide different tone colors, there is negligible interaction of one matrix impedance with the others. Point B also implies low hum pickup from stray electric fields in a practical embodiment which may have relatively long unshielded lines connecting $PL_5$ to $A_5$, $PL_6$ to $A_6$, etc.

All of the collectors of transistors $A_5$, $A_6$, etc. are supplied current through the same primary winding $T_p$.

Each of the parallel-resonant tank circuits $C_5L_5$ and $C_6L_6$ appears as a high valued 100 KΩ resistance at its respective resonance frequency to each driver amplifier which has an internal source resistance amounting to several megohms. But the transformer primary winding Tp sees a source of signal voltage composed of 154 series-resonant circuits connected in parallel which look like very low resistances at their respective resonance frequencies. Hence the transformer is driven by a very low Thevenin equivalent source resistance, which in turn generates little thermal noise.

However, difficulty is experienced in obtaining a 1Ω primary impedance, with wide-band response, low hum pickup and a reasonable step-up ratio. Therefore, as in FIGURE 5, a transistor TA can be interposed between point N and the expression control 5, omitting the transformer T, of FIGURE 4. The node N (FIGURES 4 and 5) have equivalent systems as sources, but in FIGURE 4 node N drives a transformer and in FIGURE 5 a transistor, which performs the function of the transformer.

Figure 5:
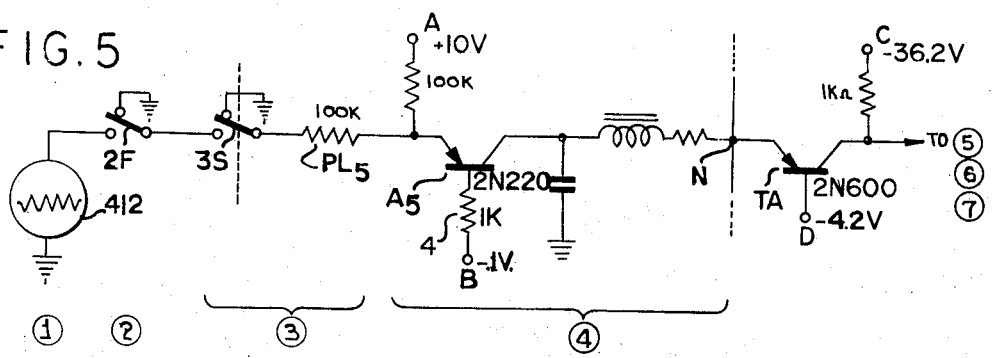
FIGURE 5 is a schematic circuit diagram of a modification of the system of FIGURE 4.

In FIGURE 5 the purpose of the resistor 4 in the base circuit of transistor $A_5$ is to prevent complete failure of the resonator bank connected to node N in the event one transistor should develop a collector-to-base short circuit, which would otherwise remove bias potential from the remaining 153 transistors having the position of $A_5$ in the system. The potential at point B (−.1 v.) is to balance out the typical +0.1 volt emitter to base potential, so that zero DC potential exists at the input of each resonator, thus preventing fluctuation in the transistor DC operating points with switching of the normally grounded stop switches 3, and/or key switches 2.

Reviewing the discussion of the system to this point, a number of continuous oscillating generators 1 can be simultaneously utilized within one division and also for a number of continuously oscillating generators 1 can be more than one division in an organ by switching their outputs via elements 2, 3, 4, 5, 6 and 7 assigned to each given division. For the system shown in FIGURE 1, a given bank of about 154 tone coloring resonators 4 per division can be simultaneously utilized to control (in the time and frequency domains) several thousand partials which may be called forth by an organist when he pulls out every stop on that division. It is usual, in both pipe and electronic organs to employ a separate generator and associated tone-coloring means for each note of each stop in those instruments which intend to do justice to the standard organ literature. Such an approach requires a considerable multiplication of component parts. According to the present invention, and in distinction to the latter approach, generators are shared among several organ divisions such as Swell, Great Choir, and Pedal. Also, a given resonator bank is shared by many, many partials of one division having separate expression.

Three complex waveform generators having unlocked fundamental frequencies corresponding to middle C4 and an octave higher C5 are shown at position 1, FIGURE 2. These signals may be switched by the organist through conventional console key-actuated, rocker-bar, coupler switches connected via a cable to remote key-relays, for which make-break contacts are shown at 2a and 2b, corresponding to the 25th and 37th swell division keys, respectively, numbering the lowest manual key as #1. The output pole is normally grounded to prevent unwanted high frequency signal feedthrough via stray capacitance bridging the key-relay contacts from input to output. Contacts 2c are associated with the key-relay corresponding to the 37th Great division manual key. FIGURE 2 primarily shows the elements associated with the swell division. The signal flow will next pass to swell division stop switches and partial level circuits 3a, 3b, 3c, then to swell division tone coloring resonators 4, and swell division expression control, amplification, and sound radiation equipment 5, 6, and 7 respectively. Output from the $C_{5III}$ generator is also utilized in the great division by routing signal through key-relay contacts 2c to a great division stop switch assembly 3d, and so on.

Returning to the generators used for the swell division tones, generator $C_{4I}$ is connected to an 8′ line via 2a so as to feed stop-switch assembly 3a, which might be a stop named Swell Phonon Diapason 8′. Only two of the required 61-pole, double throw ganged switches are shown at 3a. Similarly, only one pole is shown for each of the other stops 3b–3d but it is understood that, for a 61-note manual "chest" or a 32-note pedal, 61- or 32-pole stop switches are required. This generator $C_{4I}$ is also "programmed" for use in a 16′ line via 2b and on to 3c which might be named Swell Flute 16′. Generator $C_{5II}$ is connected via 2a in a 4′ line and onto 3b, Swell Flute 4′, so as to make clear the point that 8′ and 4′ stops elicited by playing swell key number 25 need not be derived from locked frequency generators. Finally, the $C_{5III}$ generator is shown connected via 2b in an 8′ line and on to 3a which may be named Swell Phonon Diapason 8′.

Directing attention more particularly to the 3a stop switch and partial level circuit assembly, the 8′ line input from $C_{4I}$ fans out so as to be able to feed a multiplicity of partial level-determining components, so that the tone quality may be adjusted as to partial content in conjunction with the band-pass and temporal control features of elements 4, the tone coloring resonators.

Figure 3:
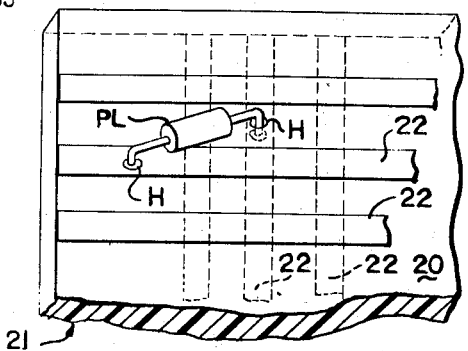
FIGURE 3 is a view in plan of a matrix board, used in the system of FIGURES 1 and 2, to accomplish level-adjusting of partials.

The cross-wiring required for partial leveling rapidly becomes difficult in a single stop having a large number of desired partials. Consequently, a double-sided, copper-clad printed circuit board, FIGURE 3, is drilled, as at H, so as to permit installation of matrix resistors PL. On the two parallel usrfaces 20 and 21, mutually perpendicular copper lines 22 are provided and so spaced as to permit installation and soldering of resistors PL, as shown in FIGURE 3. It has been found that two matrix boards, each 17″ x 20″, can accommodate one 61-note stop of even the most unusual or brilliant tone quality.

The stop switch is attached to each matrix board pair via a disconnect (not shown), so that stops can be interchanged for custom installations. Matrix board output connections are made via a tape-cable harness. An average of eighteen "stops" can be housed in each of four divisional cabinets that measure about 3′ x 3′ x 6′.

The signal output of the matrices are next routed to tone coloring resonators 4, as shown in FIGURE 2. Signal amplitudes have been very carefully determined by the matrix resistors, but all the signals still have the same complex waveforms as that of the generators at the inputs to the resonators. At the common output line from the resonators, however, the waveforms for different stops are considerably different from one another because of the band-pass action of the individual components that combine to form a bank of resonators, denominated as elements 4. However, the frequency selective properties of the resonators are not the only important properties derived from these resonators. Their temporal response makes possible a number of musically desirable transient effects, both in amplitude and frequency, even though the switching means in elements 2 and 3 are of the simple make-break variety.

Toroidal-core inductance coils in a parallel resonant "tank circuit" arrangement are used as resonators for a number of reasons. Chief among these are their relatively high Q at audio frequencies, along with small physical size, their small susceptibility to pickup or radiation of external electromagnetic fields, whether hum or audio frequencies, when densely packed, their constancy of inductance and Q with change in dynamic signal level as well as with change in temperature. The inductors are wound, baked, and subsequently packaged in sealed cans to guard against long term drift which could be caused by ingress of moisture. Capacitors having equally stable temperature characteristics and high Q are combined with these inductors to tune them to frequencies corresponding to those of the equally tempered scale.

Over most of the range, resonators are also tuned midway between adjacent semitones as indicated by + marks in 4 of FIGURE 2, to provide for selection of partials which do not have the same frequencies as those corresponding exactly to the equally-tempered scale. It is found that 154 resonators can accommodate all partials of all stops in one division, embracing a gamut of frequencies from about 32 c.p.s. to 5000 c.p.s. Twelve laminated-core inductors are added for the 32′ pedal notes in the frequency range 16 c.p.s. to 32 c.p.s. From 5000 c.p.s. to 16,000 c.p.s., resonators are not used. In their place, it is found that simple RC low-pass filters can be used at the matrix board position 3. The abrupt attack and release of these high frequency tones, which have no resonators to "slow them down," is adjudged by musicians to be not only acceptable, but desirable. One such RC low-pass filter is indicated in FIGURE 2 at 3E. It is to be observed that its output line bypasses the resonator bank 4 and connects directly to the common output line P.

A given bank of 154 resonators with 154 individual inputs and a common output may be regarded as a comb-filter. A means of combining their outputs without severe loss of signal and degradation in available signal-to-thermal noise ratio is shown in FIGURE 4. A "constant current," high source-impedance driver-amplifier is added to each L, C filter. A common-base transistor amplifier is used for this purpose since it also has the additional properties of (A) unity current gain and (B) low input impedance. Point (A) means that the signal voltage across the L, C tank is a healthy high value equal to that of the input generator voltage, when the signal frequency coincides with the tank resonance frequency. This results from the fact that the resonant tank impedance is designed to be 100,000 ohms (which also gives practical values of L and C) plus the fact that a typical matrix resistor value is 100,000 ohms. This latter level minimizes loading on the generators which could otherwise be serious if one considers, say, 100 utilizations of a single generator output. Also, because of point (B), as a new tone color is being created in the laboratory, or a new customized stop installation is being installed in the field, there is negligible interaction of one matrix resistor value on the intended effects of the other resistors. A second and very practical reason for desiring point (B) is that of hum pickup from stray electric fields. It would be very difficult to shield the long cable lines extending from the matrix board resistor outputs to the resonator inputs. With the method revealed in FIGURE 4, such shielding is not necessary, since the impedance at the input of the common base amplifier on each resonator is so low.

FIGURE 4 reveals a method for combining the output signals from all 154 resonators, which consists of connecting the output sides of all the inductors to a common node N. All of the collectors are supplied current through the primary Tp of the coupling transformer T. The impedance looking into the primary of T must be very low (in the order of 1 ohm), so as not to reduce the Q's of the various L, C circuits, nor permit mutual interaction between them, such as might occur when tuning one coil. Otherwise, all 153 other coils would need to be retuned when one coil was tuned. At each resonance frequency, the L and C in parallel resonance appear to the amplifier as a relatively high (100,000 ohms) resistance and, looking in the other direction, the driver amplifier appears as a very high source resistance (several megohms, depending on matrix resistors) at all frequencies. The primary of T looks back into 154 series L, C circuits which are all in parallel with one another. As is well known, an L-C series circuit of good Q appears as a very low-valued series resistance at series resonance. Hence, over the complete band of audio frequencies of interest, the transformer is driven with a set of equivalent sources having low values of Thevenin-equivalent source resistances (about 100 ohms each). Since the thermal noise power of a source is proportional to its resistance value and to the bandwidth under consideration, this configuration is desirable.

It was found in practice that, on certain stops, a more obvious initial transient effect (sometimes called "chiff") was desired than was available by means of previous techniques and the generator voltages available (about 4 volts peak-to-peak). Hence, a "bucket capacitor" C, FIGURE 6, was connected so that it would discharge into selected stop-relays, matrix resistors and resonator inputs upon closure of "on" key-relay contacts 32, but would not introduce any form of excitation to the resonators upon closure of the "off" key-relay contacts. The voltage E may be increased to 100 volts to produce a very loud chiff effect, or reduced to zero for no chiff effect, and obviously intermediate values are available.

The chiff stop switch is used in conjunction with another tone color, such as a Stopped Flute 8′. The values of C and their associated resistances are scaled, so that low-pitched tones have longer chiff discharge time constants than high-pitched tones.

The keying scheme of FIGURE 6 is extended to include a diode gate, FIGURE 8, to produce a different chiff effect. This makes possible control over the rise time of the chiff tone as produced by the circuit of FIGURE 6, which may be somewhat fast or "clicky" for some applications. It also permits keying-on of noise bursts at the beginning of a tone, as well as steadily generated tones from sawtooth generators. Thus, the initial transient momentary effects of a puff of wind and an inharmonic mode having its own retinue of harmonics could be added to a "regular" tone color such as Koppelfloete 4′ to achieve very realistic effects.

FIGURE 8 is a simplified version of the system of FIGURE 7. In FIGURE 8, the bucket capacitor C, is essentially in shunt with gate G and is normally charged when no keys are played (the condition illustrated). In FIGURE 9, (claimed in an application of J. Brombaugh, Ser. No. 313,205, filed Oct. 2, 1963, now Patent No. 3,333,042 and assigned to the assignee of this invention), the capacitor $C_1$ is essentially in series with the gate G and is normally discharged (via $R_1$, $R_2$, the gate input resistance to ground, and $E_2$). When the organist plays a key so that the switch is moved to the "on" position, the charge in C (FIGURE 8) is transferred to the gate, allowing a momentary signal to pass through the gate. The rise time is slowed down by the use of the R, C low pass filter, LPF. The discharge time of C and the waveshape of the discharge voltage impressed on the gate is determined by the value of C itself, the resistances and capacitor in the low pass filter LPF and the input resistance of the gate. In a similar manner, upon closure of the switch in FIGURE 9, capacitor $C_1$ charges up via the gate input resistance and the Thevenin equivalent source resistance. The rise time is slowed down by $C_2$. During the time interval that $C_1$ is being charged, the momentary "chiff" signal is passed through the gate. Thus far the circuits in FIGURES 8 and 9 are different only because of a charged shunt capacitor versus an uncharged series capacitor. An added feature of not having the chiff signal come on as loud for rapidly reiterated switch closures is merely a matter of choosing resistances (R) appropriately in FIGURE 8, or the Thevenin equivalent resistance in FIGURE 9. The distinction between FIGURES 8 and 9 lies in the additional wave shaping means employing diode D, resistance $R_2$, and source $E_2$. These components are so arranged that the declining envelope of the "chiff" signal is essentially off before its associated tone is fully on. This temporal relationship is very important to achieve good musical results. An additional distinction between the circuits in FIGURES 8 and 9 is that a single-pole, double-throw switch is required in FIGURE 8 whereas the circuit of FIGURE 9 can utilize a single-pole, single-throw switch, i.e. terminal 31 is not needed.

Turning now more particularly to FIGURE 7 of the accompanying drawings, there is described in detail a complete chiff generator, to be used in conjunction with a tone signal generator, TG, on closure of ganged key switches KS and KS1. It will be recalled that the tone signal generators TG supply tone signal to level circuits and resonators, and generators TG may be taken to represent one or more ranks, and essentially is a source of partials needed to synthesize a tone color, however derived. The tone color involves a finite and audible rise time, due to the Q factors of resonators (4).

Switch KS1 includes a movable contact 30, and two stationary contacts 31, 32. Contact 31 is connected to a voltage source E, which may be of considerable magnitude in relation to the signal output of generators TG, say 100 v. versus 4 v. Contact 32 is connected to storage capacitor C and movable contact 30 is normally up, so that capacitor C is normally charged. On depression of a key, contact 30 moves to contact 32 and the voltage of capacitor C is transferred to line 33, which proceeds via a large resistance 34 to a node 35, leading in parallel to capacitor 36 and input terminal 37 of gate G via a second large resistance 38.

Resistance 34 and capacitor 36 represent a low pass filter, and slow down the application of voltage from capacitor C to gate input 37, causing that input to start at zero and to build up gradually.

The gate G is of known type and passes signal in accordance with gating voltage applied to point 37, being normally "off" or non-conductive.

Applied to point 37 is a pair of generators NG and SG. NG is a noise generator while SG generates a spectrum of frequencies whose fundamental $f_1$, is not a harmonic of the associated tone provided by generators TG. For some types of chiff the fundamental of generator SG may be about 5.5 to 6 times the fundamental of generators TG. For others it may be subharmonic. The generator SG may be a generator in any event available in the organ for purpose of tone generation, or may be specially provided for chiff generation.

The system of FIGURE 6 is one in which the capacitor C itself provides a wave form capable of exciting resonators, and of being discharged in the process. The line 33 can be connected, if desired, by a resistance matrix (FIGURE 3) to selected resonators (4), if it is desired to level the partials, or directly to the resonators (4) if it is not desired to provide leveling.

In the system of FIGURE 9 provision is made, i.e. voltage source $E_2$, resistance $R_2$ and diode D, to effect relatively linear and rapid decay of the DC gate control signal. In FIGURE 9, the series capacitor $C_1$, in series with gate terminal 37, sustains a current in the direction of gating terminal 37 only transiently, while it is charging. $C_2$ acts as a low-pass filter component, $Rs$, $R_1$, $R_2$ providing the necessary resistance, which slows rise time of the pulse applied via $C_1$ to gating terminal 37. On disconnecting contacts 30, 32 capacitor $C_1$ discharges and discharge occurs via diode D and resistance $R_1$. Voltage source $E_2$ in series with resistance $R_2$ accelerates the discharge of capacitor $C_1$ by selecting a suitable bias point for diode D. In the system of FIGURE 9, and assuming simultaneous closure of a tone-signal keying switch and of switch KS1, chiff can be arranged to develop and disappear, essentially before the main tone is fully on.

Proceeding now to a more detailed exposition of a complete organ system, the invention is described in connection with the use of ranks of generators of the type shown in the Kock patent hereinabove referred to and in Patent No. 2,555,038 dated May 29, 1951 to Jones, or preferably of the unsymmetrical multi-vibrator type described in Reference Data for Radio Engineers, third edition, 1949, Federal Telephone and Radio Corporation, page 268, it being understood that the invention is not confined thereto. Any sources of electrical oscillations capable of producing wave forms which are related in fundamental frequency in accordance with the tempered musical scale, and which produce oscillations rich in harmonic content, may be used. Each exemplary generator rank is organized in twelve cascaded series, each embodying a stable oscillator producing frequencies in a high register, and a series of controlled oscillators operating at ½, ¼, etc. of the frequency of the controlling oscillator. Such a generator rank is easily organized on a single frame (there being a chassis for each series, and usually a power chassis), the generator rank being compact and easily mounted.

A plurality of generator ranks is used in the system of this invention to obtain ensemble and celeste effects and for other purposes. In FIGURE 10 the generator ranks are shown in the upper lefthand corner as blocks. Numerals 101 to 109, inclusive, are generator ranks of standard type producing harmonically rich oscillations extending from about 32 c.p.s. ($C_2$) to 4 kc./sec. ($C_8$). Two of these generator ranks are detuned with respect to each other or the others by an amount sufficient to give a celeste effect (usually from 12¢ flat to 8¢ sharp) while the remaining seven are detuned as respects each other only by amounts (generally 3¢ flat to 3¢ sharp) sufficient to produce an ensemble effect. Needless to say, one of the generator ranks will usually be tuned accurately on pitch, referred to the A 440 c.p.s. standard. The number of generator ranks is arbitrary, fewer or more may be used depending upon the elaboration of the instrument and the number of voices planned. Numerals 110 and 111 indicate supplementary generator ranks producing oscillations from 4 kc. ($C\#_8$) to 8 kc. ($C_9$). There are two of these so that they may be detuned with respect to each other, for ensemble. Numeral 112 indicates another small generator rank producing oscillations from 8 kc. ($C\#_9$) to 16 kc. ($C_{10}$). Since such high frequencies approach the limit of audibility, ensemble is not too important, and only one such rank need be provided. Numeral 113 indicates another small supplementary generator rank producing oscillations from 16 c.p.s. ($C_0$) to 32 c.p.s. ($B_0$), largely for pedal use. Ensemble is not too important here either for the same reasons.

As indicated, any sort of generator may be used, including electronic, electro-mechanical, photo-electric and others. Electronic generators may be transistorized to diminish bulk. Nevertheless, considering the bulk of the generator ranks, the bulk of the reasonators hereinafter described, and the complexity of the interconnections, it will be not usually be found feasible to house all of the electrical parts of the system in a console. Consequently the bulk of the electrical parts making up the system are located in a cabinet (configured to give ready access to the parts for replacement and repair) at a point remote from the console. The cabinet may, for example, be located in an organ loft, or in a basement or other separate part of a building in which the organ is to be used.

The dot-dash rectangle 114 in FIGURE 10 represents an organ console. It may contain manuals 115, 116, 117 and 118 for the Swell, Great, Choir and Echo organs and a Pedal clavier 119, together with simple make-and-break switches for each key. In an instrument having 61 keys per manual and 32 in the pedal clavier, this part of the console would be connected with the remote cabinet by a 276 wire cable, (i.e. 4 x 61+32) marked 125, for DC control currents. The console will also contain tone color tabs 120–124 incl. with switches for the several voices pertaining to the manuals and pedals. Assuming 13 voices for the Swell, 9 voices for the Great, 11 voices for the Choir, 8 voices for the Echo and 15 voices for the Pedal clavier, this part of the console would be connected with the remote cabinet by a 56 wire cable 226. A common return path for these control circuits must also be provided. Combination pistons will probably be desired. If these are arranged for by mechanical means in the console, the wiring is not complicated. If of the electrical remote "capture" variety, it is obvious that additional cables must be employed. The console will also contain expression pedals, or volume control shoes. Certain ones of these are indicated at 125, 126 and 127 for the Swell, Choir and Echo divisions, it being understood that more or fewer may be provided as desired. These will be required to be connected to other components of the system by suitable wiring. The console may contain other control elements in accordance with the designer's desires.

Where herein data are given as to numbers of manuals, numbers of voices, numbers of circuit connections and the like, it will be understood that these are exemplary but not limiting. The data herein chosen are appropriate for a concert organ of the American Classic style, as an example.

The connections carrying audio frequency voltages from the several generators in the ranks 101 to 113 are brought out most conveniently to a central terminal board 128 located in the cabinet. In the exemplary embodiment, there will be a total of 813 connections to and a minimum of this number from this board. Oscillations from the generators are next carried to a gang of remote key switches indicated at 129 in FIGURE 1 and divided into blocks indicative of switches for the Swell, Great, Choir and Echo manuals and the Pedal clavier. In the system of this invention, oscillations of different footages are not collected in separate headers, but must be handled individually. At the same time, it will be found that it is desirable, upon the actuation of a single key, to derive oscillations from a plurality of generators. As a consequence, the remote key switches in the bank 129 are generally in the form of electro-magnetically actuated multi-contact relays, or their equivalent. By way of example, there may be 3,497 connections between the remote key switches in the bank 129 and the remote tone color switches in the bank 130. Here again, each lead containing oscillations derived from a generator must be switched separately; and the tone color switches are also in the form of multi-contact relays. There will be at least the same number of connections (namely 3,497) between the bank of remote tone color switches 130 and a spreader terminal board 131 to facilitate connections to individual resonator circuits as hereinafter described. Key and stop switching details will be described hereinafter.

Figure 11:
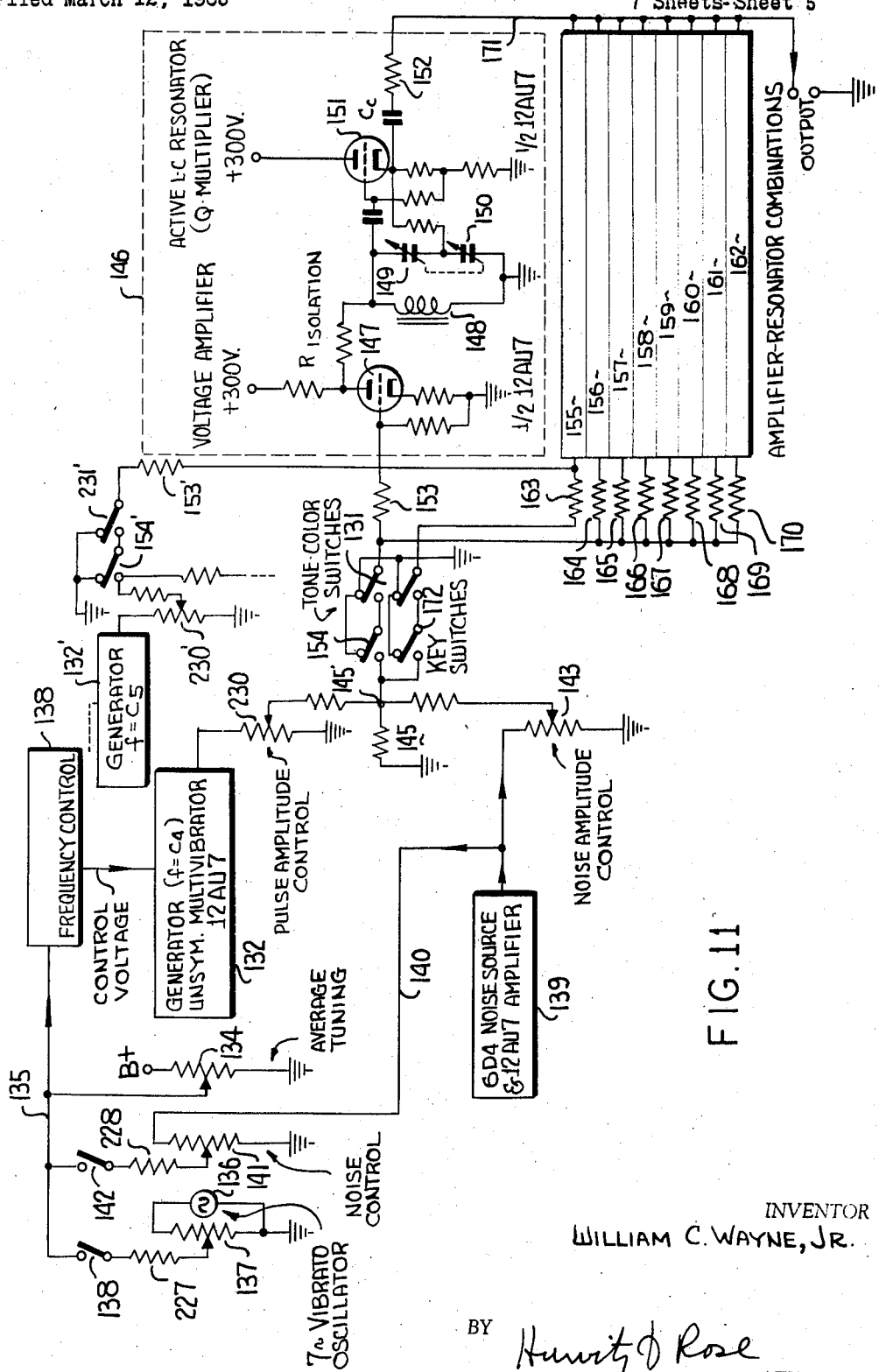
FIGURE 11 is a largely block diagram of a monophonic organ system employing the principles of the invention.

Before describing the remainder of the system as illustrated in FIGURE 10, it is necessary to describe the manner in which any given voice is derived from a single set of oscillators. Reference is made to FIGURE 11 wherein the block 132 is representative of a single pulse source or generator. As previously indicated, the generator may take various forms, but is preferably a voltage controllable oscillator, which varies in frequency as a function of bias or control voltage amplitude.

The generator 132 may be fed with the required control voltage by a frequency control device 138, i.e. a source of control voltage capable of controlling the frequency of generator 132. Ahead of this means there is shown a potentiometer 134 for average tuning of generator 132, connected between ground and a suitable source of B+ voltage such as one capable of delivering +300 volts.

The lead 135 leading to frequency control device 133 is connected with an oscillator 136 arranged to provide control voltage at a subaudible frequency such as 7 cycles per second. This oscillator is used to provide a frequency modulation or vibrato voltage for vibrato modulating the output of the generator 132. It may be provided with a potentiometer 137a to control the extent of vibrato and a switch 138 to disable vibrato.

The block 139 in FIGURE 11 represents an electrical noise generator of convention type, and usually a circuit containing a gaseous tube of the thyratron variety. The output of this noise generator is divided. By means of a lead 140, a portion of the output is carried back to the lead 135 through a potentiometer 141 and switch 142. The introduction of noise frequency into the generator 132 will produce a random frequency variation which is not similar to a vibrato but rather gives an effect bordering on ensemble. Suitable decoupling resistors 227 and 228 are provided so that potentiometers 137a and 141 can be adjusted without interaction. The other portion of the output of the noise source 139 is carried through a potentiometer 143 to the resonator circuits hereinafter described. The output of the generator 132 is similarly carried through a pulse amplitude potentiometer 230 to the resonator circuits later described. The combined outputs of the generator 132 and the noise source 139 may be so transferred through a linear mixer indicated at 145.

The purpose of the resonator circuits is to select from the complex tone derived primarily from the generator 132 suitable partials which may be later combined at desired amplitudes to produce a given voice or tone color. Since the partials produced by the resonant circuits of this invention are keyed, and because of the characteristics of the resonators, which are high Q, the resultant voice can have various characteristics including an initial transient, a tone envelope similar to that of a pipe organ, a similar final transient, and the like.

The resonator circuits, in order to fulfill their function, must have a relatively high Q, where Q is defined as $2\pi$ times the ratio of vibrational energy stored in the circuit to the energy lost per cycle at a given frequency. Various types of resonators may be employed, including active L-C Q-multipliers (e.g. Colpitts oscillators on the verge of oscillation), active R-C resonators (phase shift oscillators on the verge of oscillation), and passive L-C resonators (resonant tank circuits) using high high Q toroidal inductors which have stable inductance values with varying AC levels, have good immunity to magnetically coupled "cross-talk" and yield high values of inductance and Q for their physical volume because of their magnetically efficient configuration. Electro-mechanical resonators such as those including tuned reeds or other vibratile devices, or acoustic resonators, may be employed. Since these would be used to affect the transients and other characteristics of electrical oscillations produced by generators in the ways described above, they are considered to be comprised in the term "electrical resonators" in the claims.

A particular type of resonator circuit is shown in FIGURE 11 in the dashed rectange 146. The first element is an electronic amplifier indicated generally at 147. The resonator proper is an active L-C resonator which comprises an inductance 148 and capacitors 149 and 150 together with an electronic tube 151. This constitutes a Colpitts-oscillator type of resonant circuit. The gain of the electronic tube 151 greatly increases the effective Q of the circuit. The output may be provided through a linear mixing resistor 152 for combination with the remaining eight resonator outputs at header 171. The amplitude of the partial passed by resonator 146 is controlled by a resistor 153 or other suitable impedance, placed before the resonator. The feeding of the signal collected at point 145 to the resonator 146 is controlled by a key switch 154, which will be one of the remote key switches of the bank 129 of FIGURE 10, in series with one pole of multi-contact tone color switches 130.

Other resonator circuits are indicated in FIGURE 11 by the blocks 155 to 162 inclusive. These may be regarded as resonators passing other partials of the applied signal voltage, and with respect to each of these, there will be a controlling resistor 163 to 170 to determine the amplitude of the particular partial selected by the resonator. The outputs of the several resonator circuits are collected in a header 171 for transmission to an amplifier and loudspeaker (not shown).

It is characteristic of resonator circuits of the various types set forth above that there is a finite build-up time for an abruptly applied signal so that the transmitted signal or portion thereof comes on gradually, which is musically desirable. Therefore, the key switch 154 (and other key switches) can be of the simple make-break type.

Furthermore, there is a finite resonator decay time so that an effect of reverberation is secured in the output system, if Q values are chosen proportional to input signal frequencies. A certain amount of the noise frequency from the source 139 will pass through the several resonator circuits, thus giving the effect of tuned "windiness" common in organ pipes.

One aspect of the operation of high Q resonators is illustrated in FIGURES 12, 13 and 14. Here the output of a single generator 214 is divided into paths 215 and 216, each path having a switch 217 or 218 which are part of a relay switch as set forth above. The paths each have separately operated tone color switches 219 and 220, with associated amplitude-adjusting impedances 153a and 153b. The paths are shown joining beyond these switches and connected to an output system 221.

Path 215 contains a high Q resonator 222. Assuming the fundamental frequency generated at 214 to be 440 c.p.s., the resonator 222 may be tuned to 439 c.p.s. This will give an initial transient envelope to the transmitted signal appearing on line 171a similar to that shown at 223 in FIGURE 13. The effect of resonator 222 will be to give an initial transient amplitude modulation to the transmitted signal of a rate equal to the difference between the frequency of the input signal and the frequency of peak response of the resonator, namely, one c.p.s. in this example. The duration of this effect is proportional to the magnitude of the resonator Q. Branch circuit 216 is shown as containing a resonator 224 which is tuned to 437 c.p.s. Initial transients produced by this resonator are illustrated at 229 in FIGURE 14, and the effect is audibly different from that illustrated in FIGURE 4. This illustrates that two different resonators connected to the output of the same generator may produce tones which, although they are similar in the steady state, nevertheless produce entirely different initial transients.

As hereinafter described, a plurality of resonators may be used in connection with the complex output of any generator.

The particular voice obtained from oscillations originally derived from the source 132 in FIGURE 11 will be dependent upon the value of the resistors 153 and 163 to 170, as determining the amplitude of the various partials. Other voices can be obtained from the same original oscillations by providing other key-switched and tone-color-switched connections between the source 132 and the same resonator circuits but using different values in these circuits for the resistors corresponding to 153 and 163 to 170. The number of resonator circuits connected to any given source of oscillations may be varied as desired depending upon the range of partials desired in the particular voice, nine resonators being shown in use in FIGURE 11.

Moreover, different oscillators may be connected to the same resonators, for it will be evident that if the resonator 146 passes the fundamental of, say $C_4$ and the resonator 155 passes the second harmonic thereof, the resonator 155 may also serve as the fundamental resonator circuit for $C_5$ an octave higher, and so on. An exemplary set of components for accomplishing this is illustrated by the generator source 132', amplitude control 230', key switch 154', tone-color switch 231' and resistor 153'. It will be understood that connections from vibrato oscillator 136 and noise source 139 will be made in a manner similar to that for pulse source 132. Indeed, while more than one bank of resonators may be used for each division of the organ, it is possible to use a single bank of resonators to handle the entire output of all of the generators in one division of the complex organ herein described, by multiplying the connections between the individual generators and selected ones of the resonator circuits in the bank. It will be understood that each such connection will contain its own amplitude-controlling impedance. Hereinafter there will be described a mode of using one bank of resonators for more than one division of the organ.

To obtain increased selectivity in a resonator, the Q is generally increased; but this also increases the response time of the resonator. Thus, it is necessary to control the parameters of the resonators so that the initial transients will not be too sluggish and the final transients will not be too reverberant. Particular resonators may have very high Q's for special effects; but in general the Q will be between 10 and several hundred, preferably about 50. For certain effects it may be desired to make the Q of the resonators proportional to the frequencies handled by them, in which case all frequencies will have the same transient times. On the other hand, if the Q values of the resonators are made equal throughout the range, the transients of low frequency components will persist longer than the transients of high frequency components. It may be desirable to divide the resonators up into groups having Q values lying between certain limits throughout the range. This may be especially valuable where, as hereinafter described, a plurality of ranks of resonators is provided, the ranks being associated either with the tones derived from different manuals, or with tones lying within certain frequency limits.

In order to be able to select out the 5th and 7th harmonics and others which are rather far off tune from equally-tempered fundamentals, adjacent resonators in a single bank may be tuned fairly close together, e.g. about one-third of a semitone apart. Having rather completely covered the frequency spectrum with resonators, it is possible to feed several adjacent resonators in parallel from a single source thereby achieving a faster response time than would be available from only one relatively high Q resonator. The high-selectivity, slow-response-time feature can thereby be preserved for some tone colors while simultaneously using the same resonators for lower selectivity, faster response time depending on their input connections.

FIGURE 11 also illustrates the obtaining of another effect common to organ pipes. Particularly in a Diapason voice, the second harmonic appears to speak first. In FIGURE 11 resonators 146 and 156 to 162 are shown as fed with oscillations from the source 132 through the switch 154. The resonator 155 for the second harmonic is shown as provided with another switch 172 which will be operated upon the actuation of the same console key. If, however, the mechanical arrangement of the contacts of remote key switches 154 and 172 is such that the switch 172 will close (in time) slightly ahead of switch 154, the effect described above, namely, the pre-sounding of the second harmonic ahead of the fundamental and other harmonics in the particular voice, will be obtained. Suitable tone color switches, so marked in FIGURE 11, will, of course, be provided.

Another aspect which may contribute to the detiming of components in a complex tone derived from an organ using the principles outlined herein results from the fact that the response time of a resonator is inversely proportional to its resonant frequency, $f$. For a simple resonant circuit composed of resistance, inductance, and capacitance, a quantity tau ($\tau$), known as the time constant, can be shown to equal Q divided by $\pi$ times $f$:

$$\tau = \frac{Q}{\pi f}$$

Tau is the time in seconds required for the circuit response to reach 63% of its steady-state value at the initial transient and also the time required to fall to 37% at the final transient. If, for example, all the resonators in a given bank are adjusted to have the same Q value at their respective resonant frequencies, it is obvious that the higher frequency components in a complex tone will come on and go off at a more rapid rate than the lower frequency components at the initial and final transients, respectively. Furthermore, this feature causes the low frequency pedal tones to come on and go off much more slowly than higher frequency manual tones as is characteristic of pipe organs. A musician who has learned to make allowance for this time-lag between his manual and pedal playing technique on a pipe organ feels immediately at ease, particularly in rapid passages which require good synchronization, on an electronic organ which incorporates this feature.

Harmonics of a single tone can be derived from different slightly detuned generators so as to obtain the inter-harmonic phase changes that occur in a single pipe tone which give it liveliness and interest in what is referred to as the "steady" state.

If a resonator is tuned to a frequency which is flat (lower) with respect to the exciting frequency, the resonator will be shock excited by an abruptly keyed-on input voltage and at first it will tend to vibrate at its own natural frequency. There will be a beat between the natural frequency of oscillation of the high Q resonator and the frequency of the exciting oscillation which will produce a sort of transient celeste effect which subsists only during the transient time interval determined by the resonator Q, but which is intimately associated with the style of playing of the operator of the instrument. This celeste beat-rate depends on the relative detuning between the resonator center frequency of maximum response and the exciting generator frequency as discussed in connection with FIGURES 12, 13 and 14.

Under the circumstances just outlined, when the playing key switch is opened, the final transient will be characterized not only by a relatively gradual decay of the tone, but also by a reversion of the resonator to its own natural frequency before the tone becomes inaudible. This will means that during the final transient the tone will go flat in pitch relative to that of the "steady" sound wave. This is a characteristic of many real wind instruments as well as of many organ pipes. For the purpose of obtaining this effect, the resonators may be tuned relatively flat to the generators by as much as 25¢ or 1.5%. If different ranks of generators are provided, different relative detunings may be practiced for different voices.

As indicated above, there may desirably be, in any given bank, as many as three resonators per semi-tone in the equally tempered musical scale. In this scale, adjacent semi-tone frequencies are in a ratio of approximately 6%; hence, the indicated resonator tunings would correspond to their having peak responses every 2% along a frequency scale. Any given generator may be connected with one or more of these three resonators as to each of the partials desired to be reproduced. Thus, the system is not confined to the production of voices with true harmonics, that is, integral multiples of a fundamental frequency throughout, but is equally applicable to the production of voices in which the partials depart from a true harmonic relationship in the transient state. This is also true in organ pipes wherein the effective vibrating length of the air column is a function of partial frequency.

A resonator whose frequency of maximum response does not bear an integral multiple relationship to the associated input frequency can be utilized for the imitation of components in pipe organ tones which exist only in the transient state. For example, a $C_3$ resonator may be shock-excited by an abruptly switched-on $C_4$ signal in addition to the usual harmonic series of resonators for $C_4$ such as $C_4$, $C_5$, $G_5$, $C_6$. Such an arrangement yields a subharmonic tone that persists for a short time only at the initial and final transients in addition to the first, second, third, and fourth harmonics that are steadily resonated throughout the duration of the tone. By this means, the "chiff" of a pipe organ Harmonic Flute and the tonguing transient of an orchestral flute can be simulated.

In the system of this invention tone colors can be adjusted on a per-stop, per-note, per-harmonic basis which is even more flexible than any voicing system which is used by a pipe organ manufacturer wherein voicing is limited to a per-stop, per-note basis.

It would be possible, on the one hand, to provide a bank of resonators for each oscillator for complex wave form in each rank of generators used in the instrument. As has already been indicated, it would be possible at the other extreme to use a single bank of resonators for the entire output of the organ, and this falls also within the scope of the invention. An intermediate type of system is, however, generally to be preferred for several reasons. In the first place, there may be desirable differences in the banks of resonators for the voices appurtenant to different manuals, such as different Q values and different relative tuning. Again, it may be preferred to provide separate expression means for different groups of voices, whether appurtenant to different manuals, or whether divided into groups in accordance with frequency. Yet again, it is generally desirable to produce the voices of different manuals through different output systems which may differ as to kind and location. In institutional organs it is very generally desirable to locate the loadspeaker assemblies for different manuals in different parts of the church or chamber in which the organ is to be used.

It is believed that the skilled worker in the art can readily ascertain from FIGURE 11, and the accompanying description, how an instrument employing a multiplicity of generator ranks, but only a single bank of resonators could be set up, since such a system would embody essentially a repetition of the elements shown in that figure.

In FIGURE 10 a system has been shown in which the tones are divided into five groups, each such group having its own resonator bank. In order to be able to control the volume of the Swell, Choir, Great, Echo, Pedal divisions independently of one another, a separate bank of resonators for each division will be required unless special circuits are used as will now be described. Such separate control permits separate radiation or reproduction, so that spatial effects between divisions become possible. In the exemplary organ, the Great Manual output and the higher frequencies of the Pedal clavier are joined and handled together. Although not shown, it would be possible to provide a separate expression pedal for this combined output; but it is preferred to have these divisions independent of expression means, corresponding to unenclosed divisions in pipe organs. A block in FIGURE 10 designated by the index numeral 173, which is intended to represent a matrix of level adjusting impedances such as resistors (corresponding to 153 and 163 to 170 of FIGURE 11) for the resonators is shown as divided into "Common," Swell, Great-Pedal, Choir and Echo divisions. It will be noted that connections 174, 175, 176, 177 and 178 are diagrammatically indicated as going from all of the divisions of the spreader terminal member 131 to the "Common" rank of level adjusting resistors. Connections 174, 176 and 177 are shown as containing volume control means 179, 180 and 181, about which more will be said later. The various connections 174 to 178 should be considered as carrying voltages which will be utilized as the low frequency components of the outputs of the Swell, Great, Choir, and Echo manuals and the Pedal clavier. Each of these connections in the exemplary embodiment is a multi-conductor cable having 608 wires. The high frequency outputs of the organ divisions are connected by connectors 182 to 186 inclusive to the divisions of the resistor matrices 173 marked respectively Swell, Great-Pedal, Choir, and Echo. It may be noted that these are connectors which ultimately provided the higher frequency outputs of the various organ divisions; and that each is a multi-lead cable containing 6,717 wires.

An assembly of resonator banks is indicated generally at 187; and it comprises resonator banks 188 to 192, inclusive. The resonator bank 188 has connection, as shown, with the "Common" group of the level adjusting resistors assembly 173, and by observing the diagram toward the right, it will be seen that the output of the resonator bank 188 goes to a common resonator mixing bank, common preamplifiers, and a common power amplifier and loudspeaker or speakers. The primary reason for organizing the lower frequencies into a separate group designated "Common" in FIG. 1 is that the lower frequencies may be reproduced at substantially any point in the church or chamber in which the organ is to be used without audible localization difference. It will be remembered that the lower frequencies in a pipe organ are generally produced by large pipes located in the open (as distinguished from a sound enclosure with expression shutters) and are frequently used for decorative purposes. Three resonators per semi-tone are not needed for the low frequency resonator bank 188 because the fifth and seventh harmonics, for example, corresponding to the lowest note, $C_0$, in this instrument lie above the frequency range of bank 188. Banks 189, 190, 191 and 192 may have three resonators per semi-tone.

The resonator bank 189 is allocated to the Swell division voices and is designated to handle oscillations having frequencies extending from $C_4$ (Middle C) to $C_{10}$. In the exemplary embodiment there will be a total of 6,717 connections between the Swell manual group of level adjusting resistors to the resonators of the bank 189; and the output of the resonator bank 189 will be organized into 179 different leads.

Similarly, the index numeral 190 indicates a full-scale resonator bank for the Great-Pedal combination; the index numeral 191 indicates a full-scale resonator bank for the Choir manual; and the index numeral 192 indicates a full-scale resonator bank appurtenant to the Echo manual. Each of these last mentioned resonator banks has output leads numbering 179 in the exemplary embodiment.

It will be understood from the previous description of FIGURE 11 that the outputs of the generators are keyed by the remote key switches in the assembly 129 and by the remote tone color switches in the assembly 130 into leads which establish connections to individual resonators of the banks 188 to 192 (there being in most instances a plurality of connections between the output of any given generator and a plurality of resonators), so that separate resonators can select separate partials of the same tone, the specific voices being determined by the values of the resistors located in the matrix assembly 173. One reason for the provision of an assembly of these resistors in a single general location, as at 173, is that specific changes in voices are facilitated. The level adjusting resistors for the various harmonics appurtenant to any particular voice may be organized after the manner of printed circuitry with resistive coatings sprayed or otherwise imposed on insulative bases to which connections are made as, for example, by spring clips. The insulative bases containing the resistive coatings are readily replaceable by others; and if the person playing the organ of this invention finds either that he is dissatisfied with one or more particular voices, or that one or more particular voices are not necessary for his purposes, the substitution of other printed circuitry elements in the matrix assembly 173 can be used either to change the specific harmonic content of certain voices, or to provide different voices as the case may be. This is an additional aspect of flexibility incorporated in the system of this invention.

The numeral 193 in FIGURE 10 indicates an assembly of groups of mixers for the outputs of the several generator ranks described above. The mixers may be linear mixers of the general type indicated at 145 in FIGURE 11. The outputs from the 181 leads 194 of the resonator bank 188 are combined in the "Common" mixer group 195 so that it need be connected by one lead only, 196, to a "common" preamplifier 197 of the assembly 198. This is in turn connected by a lead 199 to a power amplifier and one or more loudspeakers diagrammatically indicated at 200. In a similar manner the outputs in the 279 leads 201 of the resonator bank 189 are mixed in the Swell manual mixing group 202 so that the combined outputs may be connected by a single lead 203 to a Swell manual preamplifier 204. Between the Swell manual preamplifier 204 and the Swell manual output system 205 there is shown a volume control or expression device 206. This expression device, which may comprise a potentiometer or similar means, is operated by the Swell manual expression shoe 125 in the console 114. Expression devices 207 and 208 have also been shown for the Choir and Echo organs, the dashed line 209 indicating their mechanical connection with expression shoes 126 and 127 in the console. Expression means may be provided for the "Common" and Great-Pedal outputs if desired; but this is not ordinarily done in organs of the American Classic type.

It may be noted that lower frequency components of the outputs of the several manual organ divisions are sent through the so-called "Common" channel, and since this is the case, it will obviously be desirable to control the amplitude or expression of these lower frequency components along with the higher frequency components of the outputs of these several manual organ divisions. This may be accomplished by means of a Thyrite volume control means which has been numbered 179, 180 and 181. Thyrite is a trade name for a silicon carbide substance which varies its resistance in accordance with a D.C. voltage bias imposed on it. The Thyrite devices are quite small and relatively inexpensive. In each of the combinations 179 to 181 there will be in the exemplary embodiment, 324 of the Thyrite devices. Means are provided in connection with the expression shoes 125, 126 and 127 to vary a D.C. voltage bias on these resistors so that the volume of the lower frequency components of the organ divisions (which are not otherwise provided with expression controlling means) may be varied with the higher frequency outputs.

The more general references previously made to key switches and stop switches will be elaborated in connection with FIGURE 15. When a key 232 in the console is depressed, a direct contact switch 233 is closed, sending direct current from a source 234 through a cable 235 to the coil of an electro-magnetically-operated relay 236 located in the remote cabinet. Thus the remote key switch 237 closes a path from a generator source 238, also located in the remote cabinet, to a contact of the remote stop switch 239. If the stop tab 240 in the console has been actuated, the direct contact stop switch 241 permits direct current from the source 234 to pass through a cable 242 which may if desired be combined with cable 235. Thus a signal from the generator 238 can pass through matrix or level adjusting resistor 244 to resonator 243 and to an output system 245. It should be observed that the signal switches 237 and 239 are preferably both of the two-position type whose movable contact poles are normally grounded when in the "off" position. This arrangement prevents signal leak-through via stray capacitance paths between the switch input and output circuits. Control of volume may be provided by a variable impedance 246 actuated by the Swell shoe 247 in the console.

The practice of the principles of this invention does not preclude the obtaining of additional voices by ordinary formant filter means should this be desired. The skilled worker in the art will understand that additional connections may be made to individual generators in the various generator ranks, and that the generator outputs passing through these connections may be keyed by additional remote key switches, collected if desired into individual headers, and that stop-controlled formant filter means may be used in connection therewith for any voices for which additional resonator banks are not found to be necessary or desired from an economic viewpoint. FIGURE 10, as a matter of fact, shows at 210 a 32-lead signal cable connecting the pedal output of the spreader terminal 131 to the Echo division of the resonator mixing bank 193. The outputs of the leads of the cable 210 are combined in an Echo pedal decoupling linear mixer indicated at 211; and the single output line of this mixer passes to the Echo division output system through a conventional, low-pass RC Bourdon 16 ft. filter indicated at 212 whose output may be controlled by a stop tab switch 213 which is physically located in the console. This is illustrative merely of an instance in which a voice may be obtained by simple formant filter means in a system otherwise as described herein.

Figure 16:
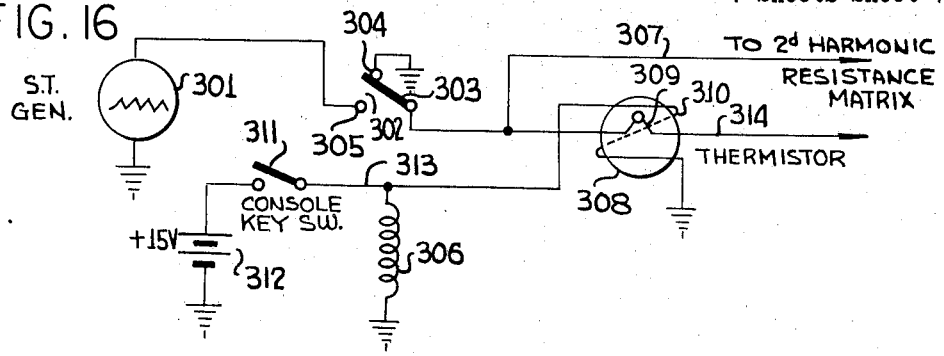
FIGURE 16 is a circuit diagram of a system for selectively delaying the onset of certain partials of an organ tone with respect to onset of the remainder of the partials.

Certain pipe organ tones provide a time delay between, say, the second harmonic and the remainder of the harmonic series constituting the tone, particularly in a diapason tone. In accordance with a feature of the present invention thermistors are employed to produce the described effect in an economical fashion. The manner of accomplishing the result in the system of an organ of the type illustrated in FIGURE 10, is specifically illustrated in FIGURE 16. In that figure is provide a sawtooth tone signal generator 301, connected in cascade with a key switch 302, which has a movable armature and two stationary contacts 304 and 305, of which 304 is grounded and in which armature 303 is normally in contact with 304, but is brought into contact with contact 305 on energization of a relay coil 306. The movable armature 303 is connected directly to a lead 307, which proceeds to a second harmonic matrix resistor. The entire tone is also supplied from the movable armature 303 through a thermistor 308, having a resistance element which has a negative thermal coefficient of resistance and having also a heater coil 310 which is arranged and located to heat the thermistor 308. A console keyboard switch 311 is provided, which is connected in series with a 15 volt active supply source 312 to the relay coil 306. The line 313 which supplies the relay coil 306 also proceeds to the thermistor heater element 310.

Accordingly, in operation when the console keyboard switch 311 is closed, energy is immediately provided to the heater coil 310. At the same time relay coil 306 pulls down its armature 303, closing the circuit from the sawtooth generator 301 to the lines 307 and 314. The latter line is in cascade with the resistance 309, a relatively high resistance when unheated, but which is reduced to a low value when heated. The energization of relay coil 306 closes contacts 303 and 305 which immediately provides signal on the line 307 which proceeds to a second harmonic matrix resistor, or to plural second harmonic matrix resistors, each of which is in series with a resonator which selects a second harmonic partial. The entire tone is also provided on the line 314, but in very small amplitude until the variable resistor 309 has been sufficiently heated to remove its resistance effectively from the circuit. Accordingly, there is a rise as a function of time in the strength of the entire tone, whereas the second harmonic alone occurs immediately.

Figure 17:
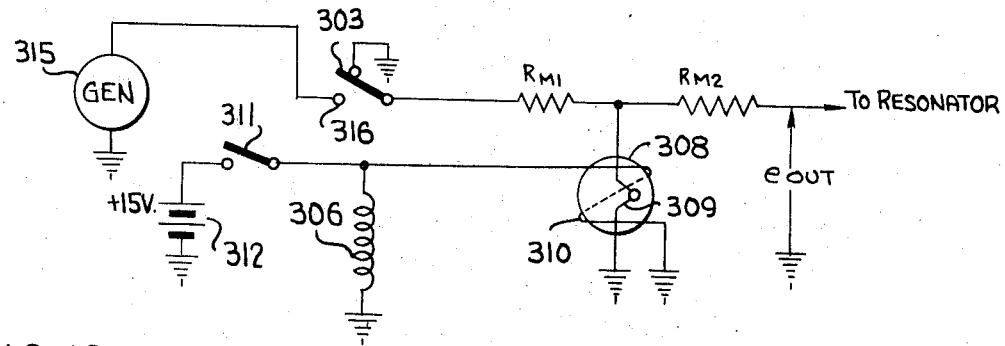
FIGURE 17 is a circuit diagram of a modification of the system of FIGURE 16.

In the system of FIGURE 17, the tone generator 315 includes not only sawtooth voltage, but also superposed noise, or the generator may be one which supplies only noise or only sawtooth. The generator 315, whether a noise generator, or a signal generator, or a signal plus noise generator, proceeds via a relay contact 316, armature 303 and voltage divider resistors RM1 and RM2 to a resonator, on energization of a relay coil 306 in response to closure of console key switch 311. The junction point of the resistances RM1 and RM2 is brought to ground through a thermistor 308, comprising variable resistance 309 and heater coil 310. As the thermistor heats up the resistance thereof decreases and provides an increasingly effective shunt path to ground for the signal from the generator 315. Accordingly, the system of FIGURE 17 provides an initial transient only in response to continued closure of the console key switch 311, and may be used to provide chiff effects in that the signal generator 315 may include a sawtooth chiff frequency plus noise or a chiff frequency without noise, or noise alone.

The system of FIGURE 10 makes provision for adding random noise frequency modulation to tone components or tones. In the system of FIGURE 11 the same noise generator may be employed to frequency modulate all generator outputs. In such case correlation exists among all the modulations, and the noise becomes more and more obvious as more keys are pressed. In the system of FIGURE 10, if noise is added to the tone on a steady state basis, the noise applied to each partial is selected from a different part of the noise spectrum, by the resonators, which reduces correlation of noise on discrete tones. Improvement in randomizing tones can be achieved by employing several uncorrelated noise sources, and by avoiding drawing from the same noise source with most commonly played chords in one octave, and in adjacent octaves.

A suitable selection scheme, to avoid correlated noise for all octaves, is as follows.

| Octave | C | C# | D | D# | E | F | F# | G | G# | A | A# | B |
|---|---|---|---|---|---|---|---|---|---|---|---|---|
| 2 | 1 | 1 | 1 | 1 | 2 | 2 | 2 | 2 | 3 | 3 | 3 | 3 |
| 3 | 2 | 2 | 2 | 2 | 3 | 3 | 3 | 3 | 1 | 1 | 1 | 1 |
| 4 | 3 | 3 | 3 | 3 | 1 | 1 | 1 | 1 | 2 | 2 | 2 | 2 |
| 5 | 1 | 1 | 1 | 1 | 2 | 2 | 2 | 2 | 3 | 3 | 3 | 3 |
| 6 | 2 | 2 | 2 | 2 | 3 | 3 | 3 | 3 | 1 | 1 | 1 | 1 |
| 7 | 3 | 3 | 3 | 3 | 1 | 1 | 1 | 1 | 2 | 2 | 2 | 2 |

In the chart the numerals under notes represent discrete noise sources of which three are shown here for illustration.

Figure 18:
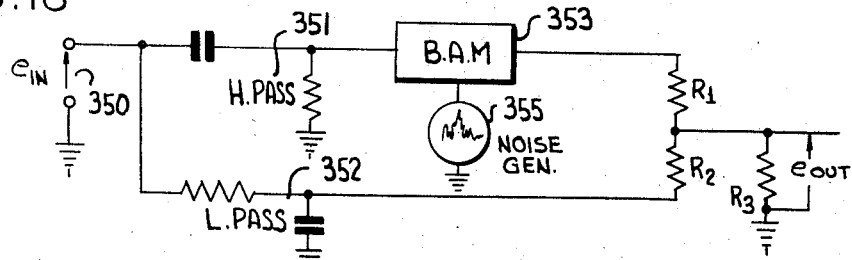
FIGURE 18 is a block diagram of a system for adding noise to organ tone.

In analyzing pipe tones, it has been observed that as one proceeds higher into the harmonic series of a given tone, the random amplitude modulation index increases. Also, the higher pitched pipes seem to be more active or random, than do the lower pitched pipes in the same rank even at the same harmonic number. This action is simulated, in the organ of the present invention, by the device of FIGURE 18, wherein 350 are tone signal input terminals for an audio band representing music. The audio signal proceeds via a high-pass filter 351 and a low-pass filter 352, in parallel paths. The filter 352 proceeds directly to an adding resistor $R_2$, for a load $R_3$. The filter 351 proceeds via a balanced amplitude modulator 353 to a complementary adding resistance $R_1$. A noise source 355 supplies modulating signal to modulator 353, in balanced relation, so that noise does not come through to load $R_3$ in absence of tone signal 350.

In operation, the high frequency components of $e_{in}$ (whether harmonics of low tones or fundamentals of high tones) easily pass through the high-pass filter 351, shown as a simple RC section. These tonal components then suffer a random amplitude modulation in the modulator 355 and finally appear at $e_{out}$ via the linear adding resistor $R_1$. On the other hand, lower frequency components pass through the low-pass filter 352 and thence through $R_2$ to the output. Components near the filter's cross-over frequency have a reduced index of amplitude modulation because of a diluting action of signal passing through the lower, direct path. In the absence of any noise-modulating voltage, $e_{out}$ should be identical to $e_{in}$. The best combination of variables for a given organ are achieved by listening tests. Some of the variables are: crossover frequency, rate of fall (or rise) for the filters, and spectral content of the noise source.

Certain tone colors contain a number of components clustered about the steady state harmonics, which exist for just a short time after the initial transient. These are noise-like components, and have the effect of providing a tongued sound characteristic of, say, a clarinet, or the scratch of a violin bow on initiating a stroke.

Figure 19:
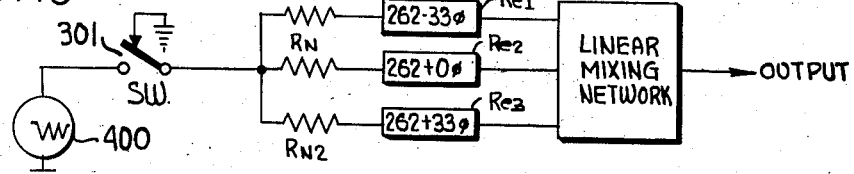
FIGURE 19 is a block diagram of a system for adding tonguing transient to a tone.

In accordance with a feature of the invention, illustrated in FIGURE 19 of the drawings, a complex tone signal generator 400, say $C_4+0¢$, at 262 c.p.s. fundamental frequency, is connected by key switch 301 to a bank of level setting resistances $RN_1$, RN and $RN_2$ in parallel, each of the resistances leading to a different resonator $Re_1$, $Re_2$, $Re_3$. The normal harmonic level setting resistance RN proceeds to a resonator tuned to $C_4+0¢$, i.e. 262 c.p.s. The noise or tonguing transient resistors $RN_1$ and $RN_2$ feed resonators $Re_1$ and $Re_3$ which are off-tuned, say to $C_4-33¢$ and $C_4+33¢$. When switch 301 is closed the off-tuned resonators are shock excited into their own resonant frequencies, yet these oscillations subside quickly (resonator Q may be 100). The resonator $Re_2$ will be driven full volume in steady state, after a rise time, but when the steady state for $Re_1$ and $Re_3$ is reached these will provide very small response. The transient will, in general be different each time the switch 301 is closed, since closures will occur at random times in the input wave form, but this merely adds variety to the tone.

A recent investigation of action times in a pipe organ, which involved a microphone pickup and subsequent photographing of the organ tone waveshapes displayed on a CRO, prompted an idea for imparting a wind modulation effect to electronically generated tones. The waveshapes were quite different with microphone located in the pipe-mouth windstream as compared to those obtained outside the windstream. It appears that the acoustic wave (of audible frequency) is borne on a stream of air whose direction is a random function of time. The velocity of this stream probably also varies randomly. These variations may be composed principally of subaudible frequency components. If this proves to be true, it may be desirable to radiate electronic "pipe" tones on randomly moving air streams as well. One simple way to accomplish this idea would be to linearly combine regular organ signals with an infrasonic signal. This combination could occur at the input to the power amplifier. Care must be taken to insure that the loudspeaker operation is linear even on occasional large peaks of the infrasonic noise signals. Of course, different filtering of the added noise could be applied to different regions of a single stop and/or on different stops. This effect should not be used on reed stops, and perhaps only on broad-scaled flue stops. If the method is regarded in the light of a Doppler effect, production of extra spectral lines around the principal lines occurs because of the random movement of the cone source relative to a stationary observer. The added noise is on continuously, hence the need for it being subaudible is apparent. This is not true in the pipe case since the wind stream is selectively switched on along with the principal tone.

Figure 20:
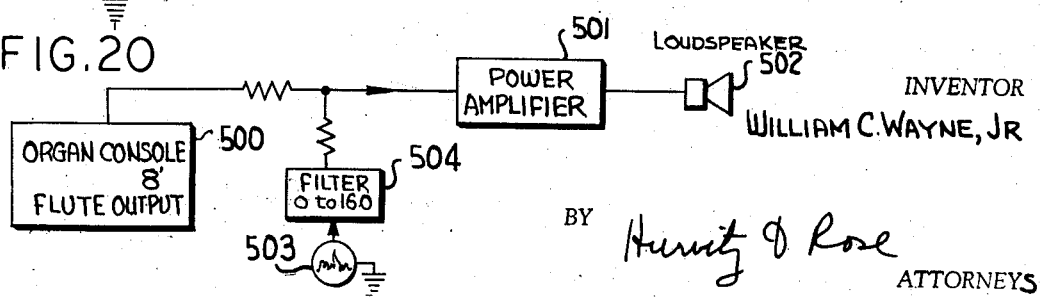
FIGURE 20 is a system for adding noise-like spectral lines about the main steady state spectral lines of an organ tone.

In FIGURE 20, 500 is an organ console, which supplies its tone in normal fashion to a power amplifier 501, and thence to a loudspeaker 502. To the input of the amplifier 501 is added random noise from a source 503, via a low pass filter 504 (0–16 c.p.s.). The noise as seen by the amplifier 501, being infrasonic, is not heard in absence of tone from console 500, but is of sufficient amplitude to move the speaker cone of speaker 502 an appreciable distance. In the presence of organ tone, the movement of the speaker cone, due to Doppler effect, produces spectral lines about the frequencies of the main tones.

Reviewing briefly the operation of the system of FIGURE 10 in order to show the relation between the simple diagram of FIGURE 1 and the complex diagram of FIGURE 10, the generator ranks 111–113 correspond with generators of FIGURE 1. The generators 111–113 are a common reservoir of complex wave forms for all divisions of the organ. For the ranks specified, 813 leads will proceed into central terminal 128, i.e. one for each generator. More leads than this will proceed out, since central terminal 128 is a distribution panel, which transfers generator signals for use by various manuals, and each generator may be used many times, i.e. in plural manuals.

The generator signals provided by central terminal 128 are applied to the key switches 129, corresponding with (2) in FIGURE 1. In an actual system, 3497 connections proceed from the switches.

The connections from the switches proceed to tone color switches 130. These select matrices (FIGURE 3), to which divisional tones are to be applied. Spreader terminal 131 is utilized merely to facilitate making connections. The connections selected by the switches 130 now route the generator signals to level adjusting resistors 173, which are located on the matrices selected by the tone color switches 130. Accordingly, (3) of FIGURE 1 is equivalent to 130 and 173 of FIGURE 10. The outputs of the matrices are connected to resonators 187, in preselected relation, i.e. selection of a matrix board by a switch assembly 130 results in concurrent selection of appropriate resonators. This implies that each of key switches 30 includes a large number of contacts, 61 in the case of a 61 key manual, and applies the separate tone signals evoked by the tone color key switches 29 each to a different matrix input. Usually 154 matrix outputs are available, to supply 154 resonators, for each matrix selected by a tone color switch 130. Leads such as 174–178 are low frequency leads carrying signals for use in low frequency elements common to the several divisions, and each includes 608 wires. Leads 182—186, inclusive, provide high frequency signal to the matrices 173, marked individually as Swell, Great, Pedal, Choir and Echo and each includes 6717 wires. The total number of wires employed in each case is a function of the total number of matrices, since all matrices are connected, subject to selection by tone color switches 130. Resonator mixing 193, FIGURE 10, involves the transfer of signal from resonators to division pre-amplifiers, and the possible cross utilization of resonators in several divisions.

The selection of resonance filters 4 for the system of FIGURES 2 or 10, can be made so that resonators pertaining to harmonics of a tone operate in the stretched mode. In a pipe organ, partials of higher and higher frequency responses of a pipe depart farther and farther, in the same sense, from true harmonic relationship. In essence, a pipe of a pipe organ has oscillation modes which are not harmonically related. To simulate pipe organ tones, then, in an organ organized according to the present invention, resonators designed to pass a set of harmonics, may be progressively detuned from true harmonic relationship. Assuming harmonic frequencies to be 100 c.p.s., 200 c.p.s., 300 c.p.s., 400 c.p.s., for example, the resonators which select these frequencies may be tuned to 100 c.p.s., 201 c.p.s., 304 c.p.s. and 408 c.p.s. The harmonic frequencies may each be accompanied by noise, as from noise source 139 (FIGURE 11), and noise amplitude control 143. It then results that each filter passes a band of noise, conformable to its own band pass characteristic, plus one harmonic frequency, or more, the filters being in stretched mode configuration. Upon keying a steady tone-signal having true harmonics, the associated filters respond initially for just a transient interval at their non-harmonic resonant frequencies, but shortly thereafter at the driven true harmonic frequencies. Since the driven frequencies do not occur (except for one of the fundamentals) at the filter resonant frequencies, a change of frequency and amplitude occurs following key closure until steady state response is attained. Both the transient and the steady state are accompanied by noise, which is passed in a spectrum which conforms with the pass band characteristics of the filters, so that maximum response to noise always occurs at the center of the filter pass bands.

For the stretched" filter tuning scheme above described, a close tonal approximation exists to the response of a pipe.

While I described and illustrated one specific embodiment of my invention, it will be clear that variations of the details of construction which are specifically illustrated and described may be resorted to without departing from the true spirit and scope of the invention as defined in the appended claims.

What I claim is:

1. In an electrical musical instrument system,
a source of a complex audio frequency electrical signal having audio frequency components corresponding at least approximately to partials of a musical tone,
an output system,
a plurality of parallel paths located between said source and said output system, said parallel paths comprising each,
an audio frequency resonator tuned at least approximately to one of said components having a Q sufficiently high and being arranged to greatly accentuate said component, and
level-adjusting means connected in cascade with said resonator, said level-adjusting means in said paths determining the relative amplitudes of said accentuated components to provide a tone having a desired tone color.

2. In an electrical musical instrument system,
a source of complex audio frequency electrical signal having audio frequency components corresponding at least approximately to partials of a musical tone,
an output system,
a plurality of parallel paths connected between said source and said output system, said parallel paths comprising each
an audio frequency high Q resonator tuned at least approximately to one of said components arranged to greatly accentuate said component, and
level-adjusting means connected in cascade with said resonator between said resonator and said source,
said level-adjusting means in said paths determining the relative amplitudes of said components to provide a tone having a desired tone color.

3. The combination according to claim 2, including make-break switches respectively connected in cascade with said level-adjusting means and said resonators.

4. The combination claimed in claim 3, wherein said make-break switches are respectively key switches connected between said level-adjusting means and said sources,
a stop switch between each make-break switch and its corresponding level-adjusting means.

5. The combination according to claim 4, wherein at least one of said resonators is detuned with respect to the component accentuated by it, by an amount selected to introduce a transient celeste effect in said output system.

6. The combination according to claim 5, wherein said source of complex electrical signal includes plural generator ranks, and wherein different ones of said components are selectable from different ones of said generator ranks.

7. The combination according to claim 6, wherein frequency adjacent pairs of said resonators have overlapping frequency response regions responsive to said components.

8. The combination according to claim 7, wherein each of said resonators has a frequency response region including adjacent frequency components pertaining to modes of the same nomenclature derived from different ones of said ranks.

9. In an electrical musical instrument,
a plurality of sources of complex audio frequency electrical signals, each signal containing audio frequency components corresponding at least approximately to partials of a musical tone,
an output system,
a plurality of circuits respectively connected in parallel between said sources and said output system, said circuits comprising each
a plurality of parallel paths connected between one of said sources and said output system, said parallel paths comprising each
a resonator tuned at least approximately to one of said components and arranged to greatly accentuate said component, and
level-adjusting means connected in cascade with said resonators, said level-adjusting means determining the relative amplitudes of said components to provide in said output system a plurality of tones having desired tone color.

10. In an electrical musical instrument system,
a plurality of sources of audio frequency complex electrical signals each containing frequency components corresponding at least approximately to partials of a musical tone,
an output system,
a plurality of audio frequency circuits respectively connected in parallel between said sources and said output system, said circuits comprising each
a plurality of parallel paths connected between one of said sources and said output system, said paths comprising each
a resonator tuned at least approximately to one of said components and arranged to greatly accentuate said component, and
level-adjusting means connected in cascade with said resonator between said resonator and said one of said sources,
said level-adjusting means determining the relative amplitudes of said components to provide a plurality of tone having desired tone color.

11. The combination according to claim 10, including make-break switches respectively connected in cascade with said level-adjusting circuits.

12. The combination claimed in claim 11, wherein said make-break switches are respectively between said level-adjusting means and said sources and including
a stop switch between each make-break switch and its corresponding level-adjusting means.

13. The combination according to claim 12, wherein at least one of said resonators in each of said paths is detuned with respect to a component passed by it, whereby to introduce a transient celeste effect in the tones in said output system.

14. An electronic organ, comprising a keyboard,
means responsive to actuation of a key of said keyboard for providing a plurality of audio frequency tone frequency components,
tone color filter means comprising
audio frequency high Q resonators for selecting different ones of said components, and
impedance means associated with said resonators for selectively attenuating the amplitudes of said components.

15. An electronic organ, comprising in cascade,
a tone generator,
a key switch,
a high Q resonator tuned to a resonance frequency lower than the output frequency of said generator, whereby on closure of said key switch a complex driving and transient celeste response of said resonator occurs and on opening of said switch a flat going transient decay occurs.

16. A system for eliminating key clicks in electronic organs, comprising in cascade
an audio frequency tone generator,
an instantaneous make-break switch,
a high Q resonator resonant to a frequency of said tone generator, the Q of said resonator being sufficiently high to provide an audibly gradual buildup as well as an audibly gradual cessation of said tone, and means for acoustically translating the response of said resonator.

17. In an electronic organ, a plurality of audio frequency relatively detuned ranks of generators of musical tone signals, means for synthesizing a single tone of desired color comprising resonators for selecting frequency components of said desired single tone from signals selected from various ones of said ranks of generators, whereby interharmonic phase changes occur in the tone color.

18. In an electronic organ, a plurality of audio frequency ranks of generators, and means for synthesizing tones of pre-selected tone colors, said last means comprising means for selecting partials from different ones of said ranks of generators to form a single tone of a preselected tone color.

19. In an electronic organ, a tone generator having sources of audio frequency complex tones arranged according to a musical scale, high Q audio frequency resonators tuned individually to select various frequency components provided by said sources of complex tones, and means for at will differently adjusting the amplitudes of the individual frequency components selected by said resonators, to provide different tone colors for each different amplitude adjustment.

20. In an electronic organ a tone generator, high Q resonators for selecting frequency components derivable from said tone generator, said resonators having overlapping frequency response regions, and said tone generator having a frequency component falling in the overlapping frequency response regions of said resonators, key operated means for at will applying a signal derived from said tone generator to said resonators, and means for electro-acoustically transducing the responses of said resonators.

21. In an electronic organ a plurality of tone generator ranks, high Q resonators for selecting frequency components from said tone generator ranks, key operated means for connecting selected frequency components of adjacent frequencies derived from separate ones of said ranks to a single one of said resonators, said single one of said resonators having a band width adequate to respond substantially to all of said frequency components of adjacent frequencies.

22. In an electrical musical instrument, a source of a musical audio frequency tone component, means for at will keying on and off said source, an audio frequency resonator having a Q above twenty and a maximum response point at approximately the frequency of said tone component, means connecting said source to said resonator, and means for electro-acoustically translating the response of said resonator to an audible tone.

23. An electronic organ, comprising in cascade, a tone generator, a key switch, a high Q resonator tuned to a resonance frequency lower than the output frequency of said generator, whereby on closure of said key switch a complex driving and transient celeste response of said resonator occurs and on opening of said switch a flat going transient decay occurs, wherein said frequency of said tone component is offset from the resonance frequency of said resonator, whereby said resonator has a decay transient at a different frequency than the steady frequency of said tone component.

24. In an electrical musical instrument, sources of DC pulses having substantial energy content in the audible range, a plurality of electrical high Q resonators, said resonators having resonance frequencies respectively covering an extended portion of the musical range of frequencies, and including the range of energy content, switching means operatively associated with said resonators for selecting connections between said source of DC pulses and selected ones of said resonators, whereby to excite the selected ones of said resonators transiently in response to said sources, and means for electro-acoustically translating the responses of said resonators.

25. A gating system, comprising, a source of DC voltage, a capacitor, a single-pole, double-throw switch having its movable contact connected to a terminal of said capacitor, said switch including an "OFF" contact connected to a pole of said source, the remaining pole of said source being connected to another terminal of said capacitor, said switch further including an "ON" contact, a source of audio signal, a gate connected in cascade with said source of signal, and means connecting said "ON" contact to said gate and including discharge means for said capacitor.

26. An electrical musical instrument, comprising a source of audio input, a gate and an audio output terminal all connected in cascade, a steady DC voltage source, a key-actuated switch, and means responsive only to initial actuation of said switch for generating a short pulse of DC voltage, and means applying said pulse to said gate to render said gate conductive during said pulse, and a resonator responsive to a frequency contained in the spectrum of said pulse connected to said audio output terminal, whereby said resonator is shock excited in response to initial actuation of said key actuated switch.

27. In an electrical musical instrument system, a console having playing keys arranged in several manuals and a pedal clavier, stop means, and a plurality of expression pedals, said system including a plurality of ranks of generators, a plurality of key-controlled switches, a plurality of multi-contact stop-controlled switches, and a plurality of banks of resonators having frequencies respectively corresponding approximately to the partials of complex oscillations produced by the generators in said ranks, switches operated by the playing keys and having operative circuit connections with said key-controlled switches, switches associated with the stops in said console and having circuit connections with said key-controlled switches, and connections through said key-controlled switches and said stop-controlled switches for each generator in said ranks to various ones and combinations of resonators in said banks of resonators, said connections including means for controlling the relative outputs of the individual resonators to which said connections are made, a separate output system for each of said banks of resonators, certain at least of said output systems including volume control means having connection with said expression pedals.

28. In an electrical musical instrument system a console having playing keys arranged in several manuals and a pedal clavier,
  stop means, and
  a plurality of expression pedals,
  said system including at a point remote from said console a cabinet containing
  a plurality of ranks of generators,
  a plurality of key-controlled switches,
  a plurality of multi-contact, stop-controlled switches, and
  a plurality of banks of resonators having frequencies respectively corresponding to the partials of complex oscillations produced by the generators in said ranks,
  switches operated by the playing keys in said console and having operative circuit connections with said remote key-controlled switches,
  switches associated with the stops in said console and having circuit connections with said remote key-controlled switches, and
  connections through said remote key-controlled switches and said remote stop-controlled switches for each generator in said ranks to various ones and combinations of resonators in said banks of resonators, said connections including means for controlling the relative outputs of the individual resonators to which said connections are made, a separate output system for each of said banks of resonators, certain at least of said output systems including volume control means having connection with said expression pedals in said console.

29. In an electronic musical instrument, the combination comprising
  a plurality of ranks of generators of electrical signals having tone-frequency components corresponding to complex musical tones,
  a bank of resonators substantially corresponding respectively in resonance frequencies to said tone-frequency components,
  a plurality of key-controlled switches,
  a plurality of stop-controlled switches,
  a plurality of level-adjusting means, and
  circuit means connecting each, but not necessarily all, of said resonators via some of said key-controlled switches, some of said stop-controlled switches and some of said level-adjusting means to some of said generators on the basis of correspondence of resonance frequencies of said resonators to tone-frequency components of said generators, and
  an output system coupled to said resonators, whereby at least one of said resonators may pass tone-frequency components from a plurality of said generators to said output system.

30. The combination claimed in claim 29, including
  a plurality of R-C low-pass filters respectively connected between those of said sources having fundamental frequencies of at least about 5000 c.p.s. and said output system via some of said key-controlled switches and some of said stop-controlled switches.

31. In an electronic organ, the combination comprising,
  a first source of electrical signals having tone-frequency components corresponding to a first complex musical tone,
  a second source of electrical signals having tone-frequency components corresponding to a second complex musical tone,
  a first key-operated switch,
  a second key-operated switch operated substantially concurrently with said first switch,
  a first stop-operated switch,
  a second stop-operated switch operated substantially concurrently with said first stop-operated switch,
  a first resonator tuned at least approximately to the fundamental component of said first tone,
  a second resonator tuned at least approximately to the second harmonic of said first tone,
  a first level-adjusting impedance,
  a second level-adjusting impedance, and
  an output system,
  circuit means connecting said first source to said output system via said first key-operated switch, said first stop-operated switch, said first level-adjusting impedance and said first resonator, and
  further circuit means connecting said second source to said output system via said second key-operated switch, said second stop-operated switch, said second level-adjusting impedance and said second resonator.

32. The combination according to claim 31, including
  a third source having tone-frequency components corresponding to said first complex musical tone,
  a third key-operated switch,
  a third stop-operated switch operable substantially concurrently with said first and second stop-operated switches,
  a third level-adjusting impedance and
  further circuit means connecting said third source to said output system via said third key-operated switch, said third stop-operated switch, said third level-adjusting impedance and said second resonator.

33. The combination claimed in claim 32, including
  a fourth key-operated switch operable substantially concurrently with said third key-operated switch,
  a fourth stop-controlled switch operable substantially concurrently with said first, second and third stop-operated switches,
  a fourth level-adjusting impedance, and
  further circuit means connecting said first source to said output system via said fourth key-operated switch, said fourth stop-operated switch, said fourth level-adjusting impedance and said first resonator.

34. The combination according to claim 33, said second source having a fundamental frequency component of at least about 5,000 c.p.s. and including
  a fifth-stop-operated switch,
  a low-pass R-C filter and
  further circuit means connecting said second source to said output system via said second key operated switch, said fifth stop-operated switch and said low-pass R-C filter.

35. In an electronic organ, the combination comprising
  a gamut of continuously running sources of musical signals corresponding in fundamental frequencies to notes of a musical scale,
  an output system,
  a first plurality of keying means respectively connecting said sources to said output system, so as to provide a gradual onset to tones created by said musical signals in said output system,
  a plurality of chiff gating means respectively connecting certain of said sources to said output system on a chiff relationship basis,
  a second plurality of keying means operatively associated respectively with said first plurality of keying means and respectively connected to said chiff gating means for deriving chiff signals during said onset of said musical signals.

36. In an electronic organ, the combination comprising
  a gamut of continuously running sources of musical signals corresponding in fundamental frequency to notes of a musical scale,
  an output system,
  a first plurality of keying means respectively connecting said sources to said output system, so as to provide a gradual onset to tones created by said musical signals in said output system,
  a plurality of chiff signal sources,
  a second plurality of keying means operatively associated respectively with said first plurality of keying means and operative to cause signal from respective ones of said chiff signal sources to create in said output system chiff tone components during said onset of said musical signals.

37. The combination claimed in claim 36, wherein said chiff signal sources comprise
continuously running sources of signals related in frequency respectively to said sources of musical signals and wherein said second plurality of keying means are inclusive of
gating means for gating signals from said chiff sources to said output system.

38. The combination claimed in claim 37, said chiff signal sources comprising respectively certain of said sources of musical signals.

39. The combination of claim 36, wherein said chiff signal sources comprise
normally inoperative sources which are keyed into operation by respective ones of said second plurality of keying means.

40. The combination comprising
a source of complex electrical signal corresponding in frequency components to a musical tone,
a key-actuated switch,
a stop-actuated switch,
a pair of level-adjusting impedance means respectively connected in cascade with
a pair of resonators having resonance frequencies respectively sharp and flat with respect to one of said frequency components of said signal,
an output system, and
circuit means connecting said source to said output system via said key-operated switch, said stop-operated switch, and both said impedance means and said resonators, whereby a starting transient of dual frequencies and a steady-state tone at the frequency of said one of said frequency components is developed in said output system.

41. In an organ system, a source of a complex audio frequency wave form providing multiple partials of a complex tone, a radiator, and means intermediate said source of complex tone signals and said radiator for individually leveling and selecting partials from said multiple partials such that a desired tone color is provided, wherein is further provided means for relatively advancing onset of a selected one of said partials with respect to others of said partials, and wherein said means for relatively advancing is a thermister delay device connected with a channel conducting said selected ones of said partials to said radiator.

42. In a system for generating a tonguing transient, a source of tone signals having a frequency component, a plurality of high Q resonators connected in parallel with each other and all in series with said source of tone signals, a linear mixing circuit connected in series with said plurality of high Q resonators, and an output circuit in cascade with said linear mixing circuit, wherein said plurality of high Q resonators includes one resonator tuned to said frequency and at least one further resonator off tuned from said frequency sufficiently to provide substantially only a transient response to said tone at said frequency.

43. In a music system, a source of musical tone audio frequency signals, a loud speaker, a source of solely infrasonic noise signal, means continuously maintaining connection of said source of infrasonic noise signal to said loud speaker, and means including key switches for at will connecting selected musical tone signals from said source of musical tone signals to said loud speaker.

44. In an electrical musical instrument system,
a source of complex audio frequency electrical signal having frequency components corresponding at least approximately to partials of a musical tone,
an output system,
a plurality of parallel paths connected between said source and said output system, said parallel paths comprising each
at least one audio frequency high Q tank circuit resonator tuned at least approximately to one of said frequency components,
level-adjusting means connected in cascade with said at least one resonator between said at least one resonator and said source,
said level-adjusting means in said paths determining the relative amplitudes of said frequency components to provide a tone having a desired tone color.

45. In an electrical musical instrument system,
a source of complex audio frequency electrical signal having frequency components corresponding at least approximately to partials of a musical tone,
an output system,
a plurality of parallel paths connected between said source and said output system, said parallel paths comprising each
an audio frequency high Q resonator tuned at least approximately to one of said components arranged to greatly accentuate said component, and
level-adjusting means connected in cascade with said resonator between said resonator and said source,
said level-adjusting means in said paths determining the relative amplitudes of said components to provide a tone having a desired tone color, wherein said resonators are selected to be increasingly detuned in proceeding from frequency component to frequency component of a complex tone.

46. The combination according to claim 45 wherein is provided noise accompanying said frequency components over bands at least as broad as the pass bands of said resonators, whereby each of said frequency components is accompanied by a background noise spectrum shaped by the resonator passing the frequency component.

47. In an electrical musical instrument system,
a source of complex audio frequency electrical signal having frequency components corresponding at least approximately to partials of a musical tone,
an output system,
a plurality of parallel paths connected between said source and said output system, said parallel paths comprising each
an audio frequency resonator tuned at least approximately to one of said components and arranged to greatly accentuate said component, and
level-adjusting means connected in cascade with said resonator between said resonator and said source,
said level-adjusting means in said paths determining the relative amplitudes of said components to provide a tone having a desired tone color,
a noise source, and
means connecting said noise source for passage through said resonators, whereby each of said partials is accompanied by a noise spectrum shaped by one of said resonators.

48. In an electronic organ system,
means for generating a plurality of tones having partials occurring over a wide band of frequencies, and
means for randomizing said partials increasingly as a function of frequency.

49. In an electronic organ system,
a source of a series of partials of progressively increasing frequencies,
means randomly amplitude modulating said partials, and
means increasing the modulation indices of the modulated partials as a direct function of frequency.

50. In an electronic organ,
a gamut of continuously running sources of musical signals corresponding in fundamental frequencies to notes of a musical scale,
an output system including a loudspeaker, a plurality of means individual to said sources for selectively connecting said sources to said output system, said means being arranged each to provide gradual onset of tones created by said musical signals in said output system, a plurality of chiff signal sources, and gating means responsive to said plurality of means for causing signal from respective ones of said chiff signal sources other than those providing said gradual onsets of tones to create in said output system appropriate transient chiff tone components primarily only during each of said gradual onsets of tones.

51. In an electronic organ, a gamut of continuously running sources of musical signals corresponding in fundamental frequencies to notes of a musical scale, an output system, a plurality of keying means respectively connecting said sources to said output system and arranged to provide gradual onset of tones in said output system created by said musical signals, a plurality of chiff signal sources, and gating means operatively associated with said first plurality of keying means for causing signal from respective ones of said chiff signal sources to create in said output system transient chiff tone components having maximum only during said onset of said musical signals.

52. An electrical musical instrument, comprising a source of audio tone signal, a gate and an audio output terminal all connected in cascade, a steady DC voltage source, a key-actuated two condition switch, capacitive means responsive only to initial actuation of said switch when long time actuated for generating a relatively short transient pulse of DC voltage having a duration which is not related to the time during which said switch is long time actuated, means applying said pulse to said gate as a gating voltage to render said gate conductive during said pulse.

53. The combination according to claim 52, wherein said capacitive means includes a capacitor connected in series between said switch and said gate, so arranged that voltage is applied to said gate as a gating voltage by means of said capacitor.

54. The combination according to claim 52, wherein said capacitive means includes a capacitor, means maintaining said capacitor charged via said switch and disconnected from said gate in one condition of said two condition switch, and means responsive to transfer of the condition of said switch from said one condition to its alternative condition for connecting said capacitor to said gate to apply the voltage of said capacitor to said gate as a gating voltage.

55. The combination according to claim 52, wherein said capacitive means includes a capacitor, means normally maintaining said capacitor charged in one condition of said two condition switch, means responsive to actuation of said switch to its other condition for transiently discharging said capacitor and thereby generating said relatively short transient pulse of DC voltage, and wherein said gate is a solid state diode gate including two diodes connected in series with each other between said source of audio tone signal and a load.

References Cited

UNITED STATES PATENTS

| | | | |
|---|---|---|---|
| 1,823,724 | 9/1931 | Carlson | 84—1.01 |
| 2,989,886 | 6/1961 | Markowitz | 84—1.24 X |
| 3,000,252 | 9/1961 | Wayne | 84—1.01 |
| 3,037,413 | 6/1962 | Markowitz | 84—1.01 X |

JOHN S. HEYMAN, Primary Examiner

J. D. FREW, Assistant Examiner

U.S. Cl. X.R.

84—1.08, 1.10, 1.13, 1.17, 1.19, 1.20, 1.27